(12) United States Patent
Gendler et al.

(10) Patent No.: US 10,198,027 B2
(45) Date of Patent: Feb. 5, 2019

(54) PROVIDING REDUCED LATENCY CREDIT INFORMATION IN A PROCESSOR

(71) Applicant: Intel Corporation, Santa Clara, CA (US)

(72) Inventors: Alexander Gendler, Kiriat Motzkin (IL); Ariel Szapiro, Tel Aviv (IL); Mark Gutman, Hod Hasharon (IL)

(73) Assignee: Intel Corporation, Santa Clara, CA (US)

( * ) Notice: Subject to any disclaimer, the term of this patent is extended or adjusted under 35 U.S.C. 154(b) by 238 days.

(21) Appl. No.: 15/370,207

(22) Filed: Dec. 6, 2016

(65) Prior Publication Data

US 2018/0157287 A1 Jun. 7, 2018

(51) Int. Cl.
*G06F 1/12* (2006.01)
*G06F 1/32* (2006.01)

(52) U.S. Cl.
CPC . *G06F 1/12* (2013.01); *G06F 1/32* (2013.01)

(58) Field of Classification Search
CPC .................................. G06F 1/12; G06F 1/3243
See application file for complete search history.

(56) References Cited

U.S. PATENT DOCUMENTS

| | | | |
|---|---|---|---|
| 2015/0188649 A1* | 7/2015 | Buckler | G06F 1/12 370/503 |
| 2016/0092357 A1 | 3/2016 | Rehana et al. | |
| 2016/0139622 A1* | 5/2016 | Barner | G06F 1/04 713/600 |
| 2016/0224090 A1 | 8/2016 | Gendler et al. | |
| 2018/0013689 A1* | 1/2018 | Miro Panades | H04L 47/30 |

OTHER PUBLICATIONS

U.S. Appl. No. 14/812,056, filed Jul. 29, 2015, entitled "Masking a Power State of a Core of a Processor," by Alexander Gendler, et al.

* cited by examiner

*Primary Examiner* — Albert Wang
(74) *Attorney, Agent, or Firm* — Trop, Pruner & Hu, P.C.

(57) ABSTRACT

In one embodiment, a processor includes a credit circuit to communicate credit information between a first clock domain of the processor and a second clock domain of the processor. The credit circuit may include: a loopback path to communicate the credit information between the first clock domain and the second clock domain; and a bypass path to cause the credit information to traverse only a portion of the loopback path, based at least in part on a state of the second clock domain. Other embodiments are described and claimed.

20 Claims, 24 Drawing Sheets

PROVIDING REDUCED LATENCY CREDIT INFORMATION IN A PROCESSOR

TECHNICAL FIELD

Embodiments relate to communication in a system, and more particularly to communication of credit information.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

In advanced processor architectures, different intellectual property (IP) logic blocks may operate at different voltages/frequencies than a fabric. To couple different devices that operate at different frequencies, one or more buffers and credit circuitry may be provided at a boundary of the IP block and fabric. The depth of such buffer(s) can be defined by a worst case latency of credit activities. As buffer depth increases, the latency of data and credit transfer increases, causing an additional increase of buffer size, further increasing complexity, cost, power consumption and reducing performance.

DETAILED DESCRIPTION

In various embodiments, credit circuitry of a processor can be dynamically controlled to reduce latencies and other delays inherent in communicating credit information between different components of the processor. More specifically, the credit circuitry can be controlled to dynamically reduce credit communication latency based at least in part on an activity state of one or more separate circuits or domains of the processor. As used herein the term "domain" is used to mean a collection of hardware and/or logic that operates at the same voltage and frequency point.

Although the scope of the present invention is not limited in this regard, in an embodiment in which the credit circuitry includes a credit loop that performs credit communication transfer from a write side to a read side and back, a multiple-level credit loop configuration is provided. When operating in a high performance environment, it is possible to reduce the size of the credit loop, e.g., close this credit loop within the writer side, to enable traversal to occur with reduced latency. In other operating environments, such as when the reader side is not in an active state (among others), the credit circuitry is controlled so that the full credit loop is traversed, without draining a buffer or stopping transfers.

In contrast without an embodiment, a single credit loop is typically provided and fully traversed in all cases, to ensure that data associated with the credit information were consumed by the reader side. With a static credit loop, larger buffer structures are required, increasing die size and power consumption, and also increasing latency. For example by using an embodiment, a buffer size can be reduced from approximately 16 entries to 6 entries. And further, transfer latency can also be reduced. As such, embodiments reduce die area, power and improve performance.

Figure 1:
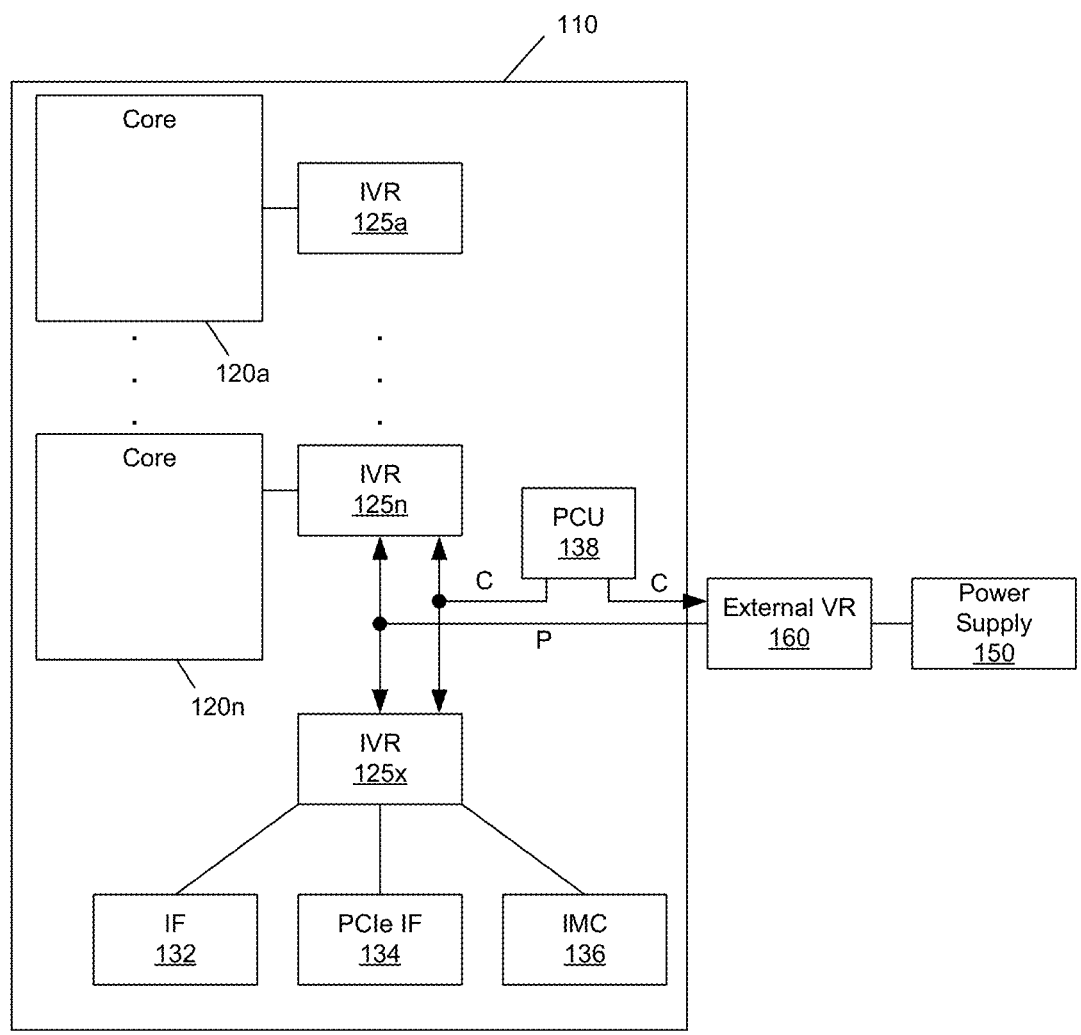
FIG. 1 is a block diagram of a portion of a system in accordance with an embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Note that power management techniques described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
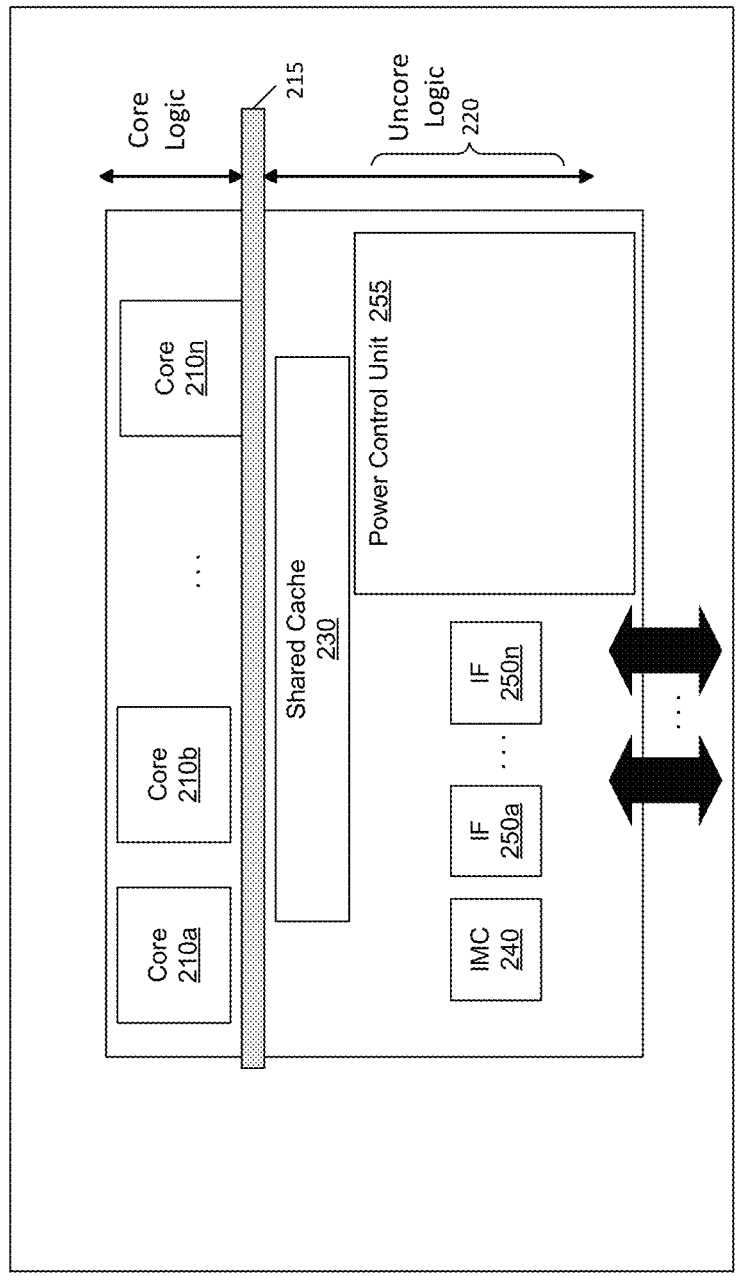
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250 and a power control unit 255, which may include logic to perform the power management techniques described herein.

In addition, by interfaces 250a-250n, connection can be made to various off-chip components such as peripheral devices, mass storage and so forth. While shown with this particular implementation in the embodiment of FIG. 2, the scope of the present invention is not limited in this regard.

Figure 3:
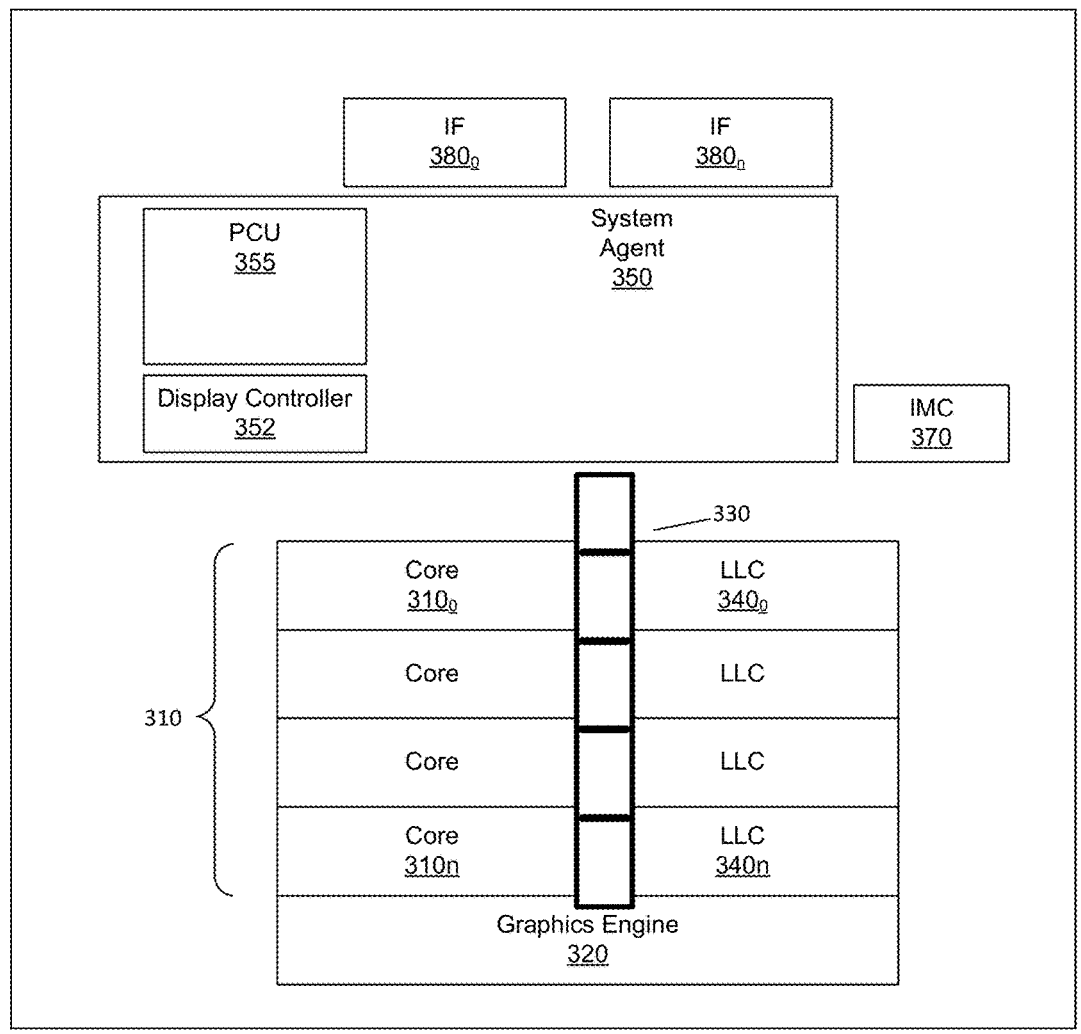
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores 310₀-310ₙ, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) 340₀-340ₙ. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include logic to perform the power management techniques described herein.

As further seen in FIG. 3, processor 300 can further include an integrated memory controller (IMC) 370 that can provide for an interface to a system memory, such as a dynamic random access memory (DRAM). Multiple interfaces 380₀-380ₙ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 3, understand the scope of the present invention is not limited in this regard.

Figure 4:
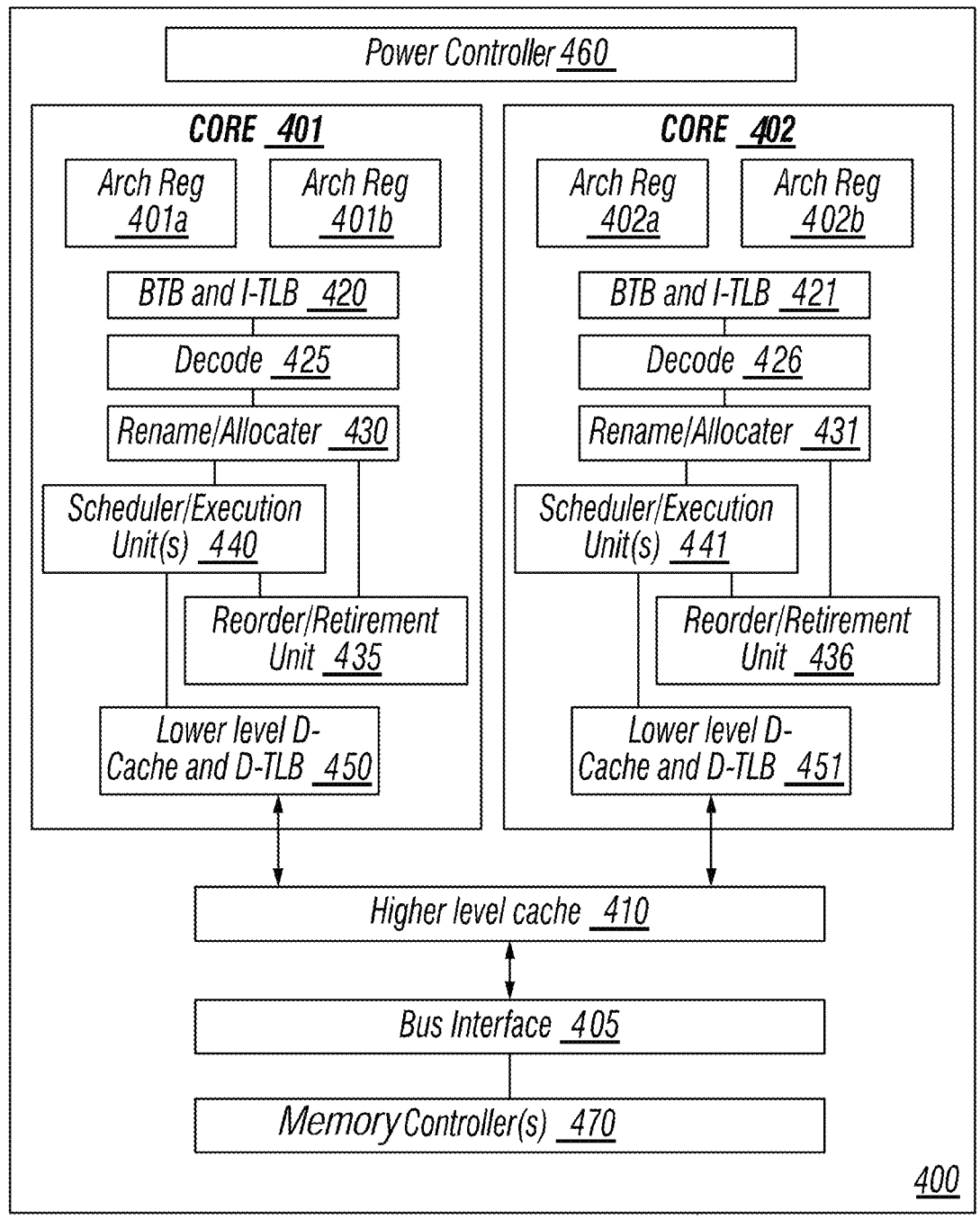
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
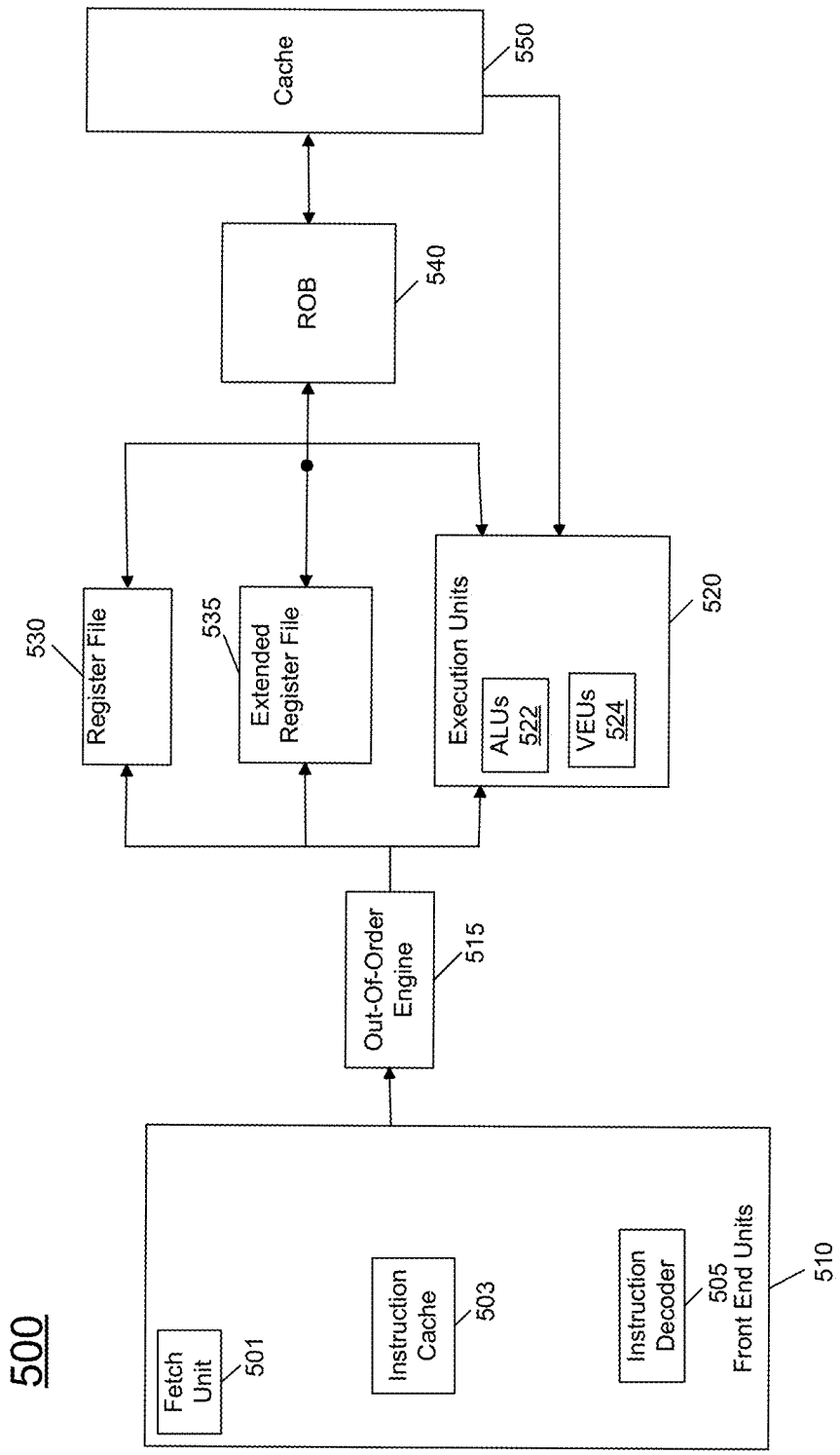
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register.

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
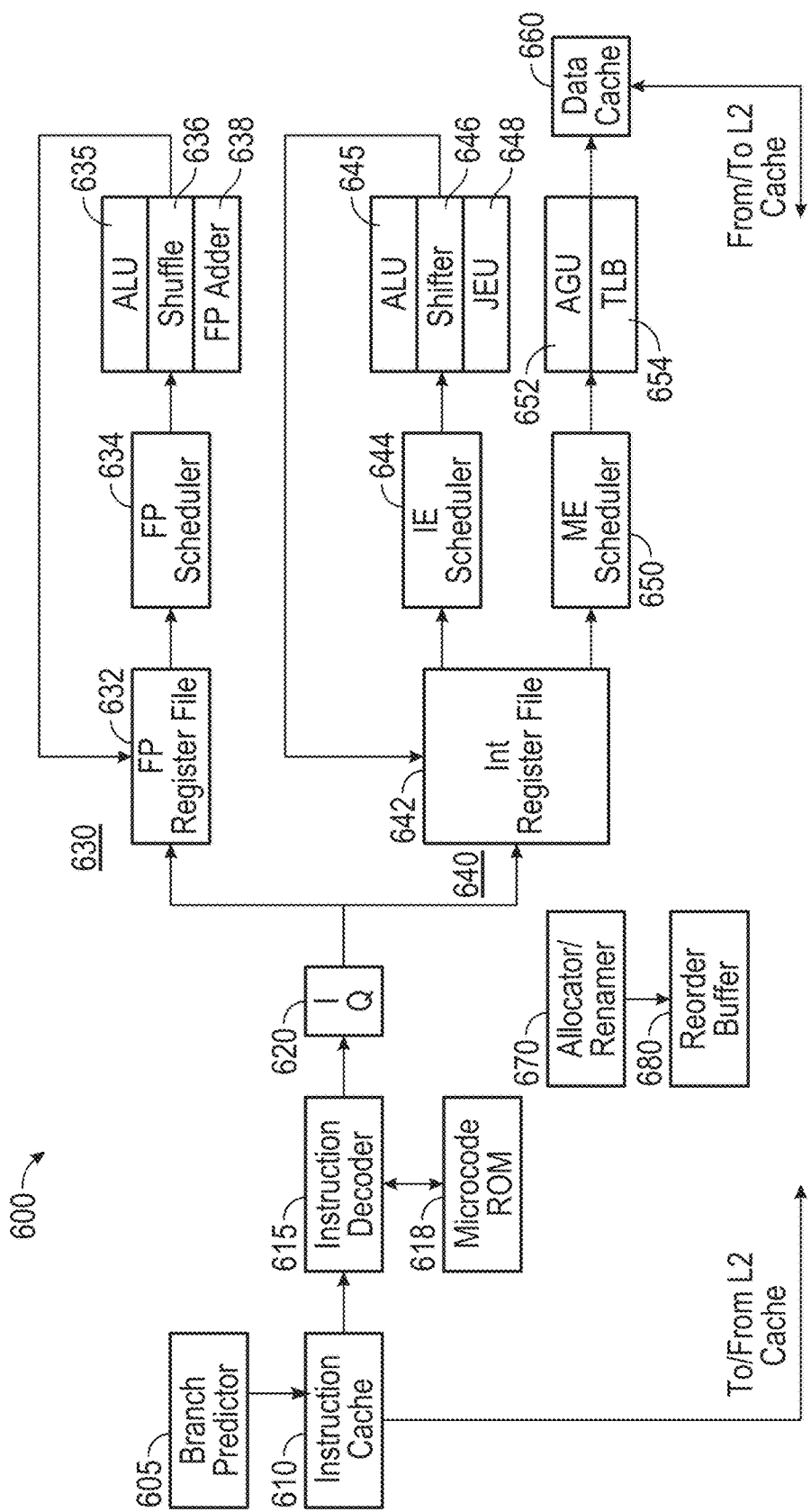
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
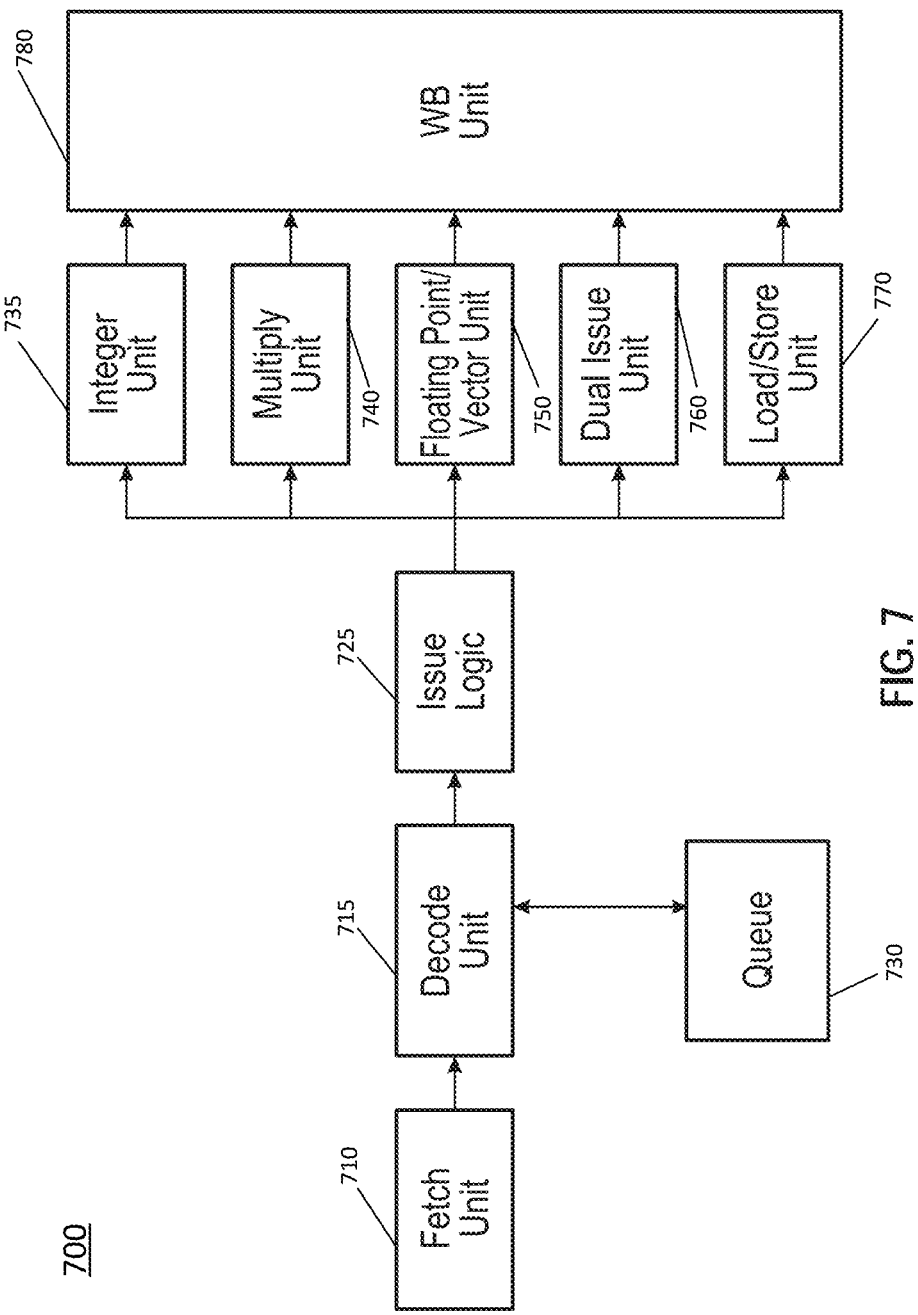
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
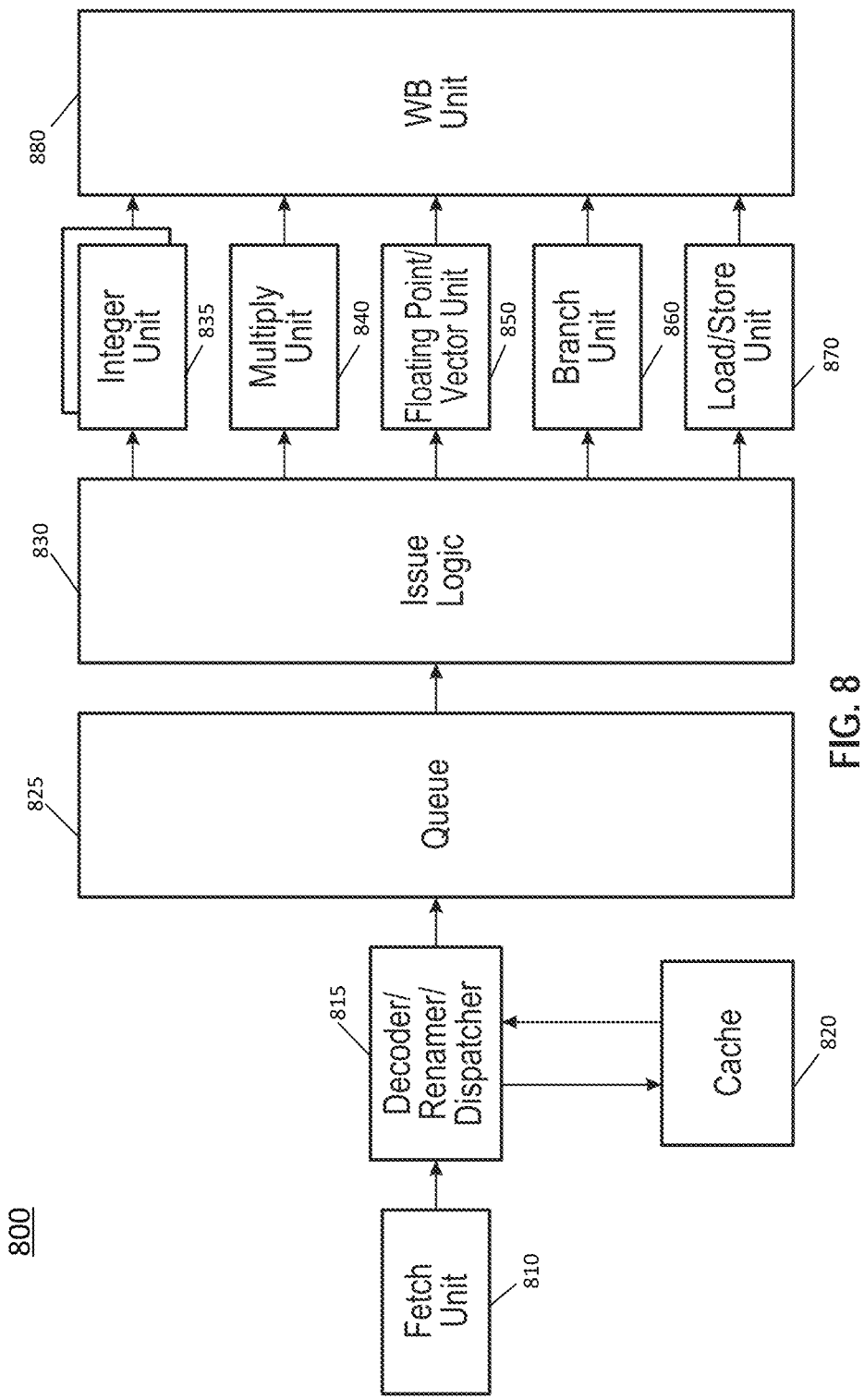
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
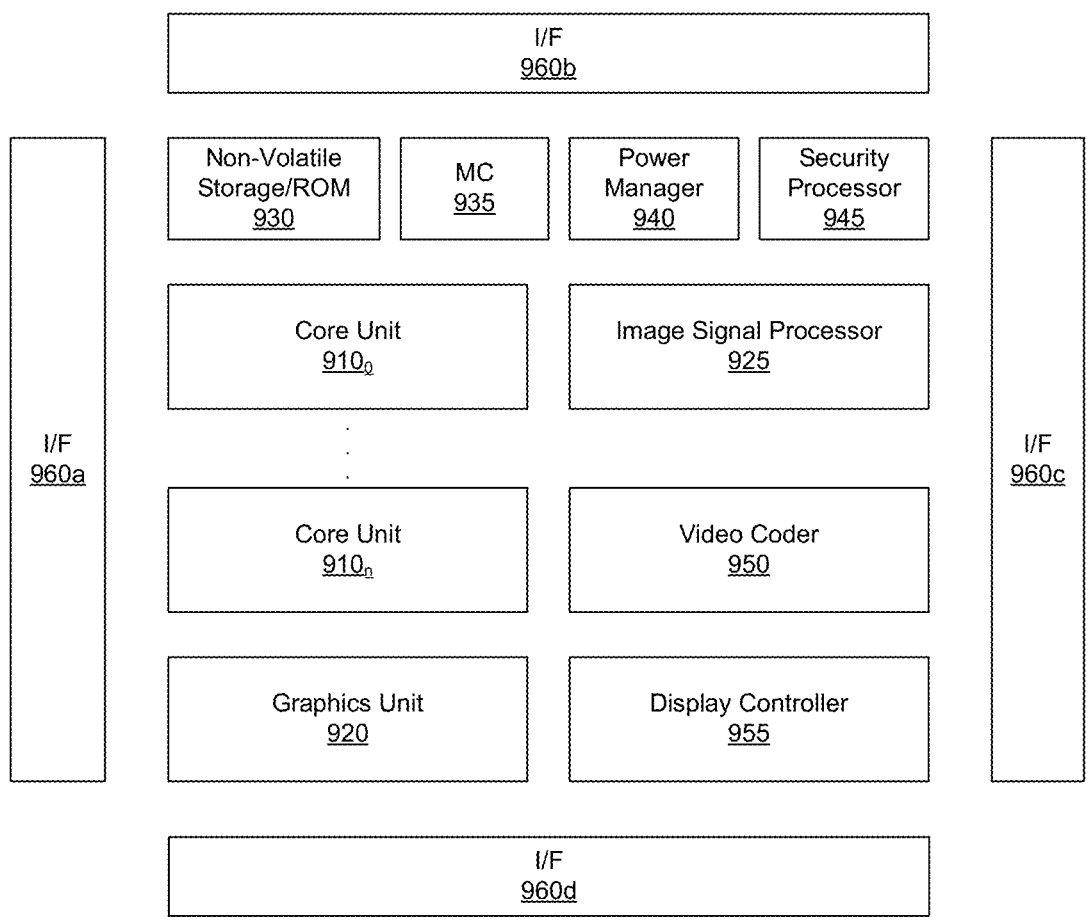
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960a-960d enable communication with one or more off-chip devices. Such communications may be according to a variety of communication protocols such as PCIe™ GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
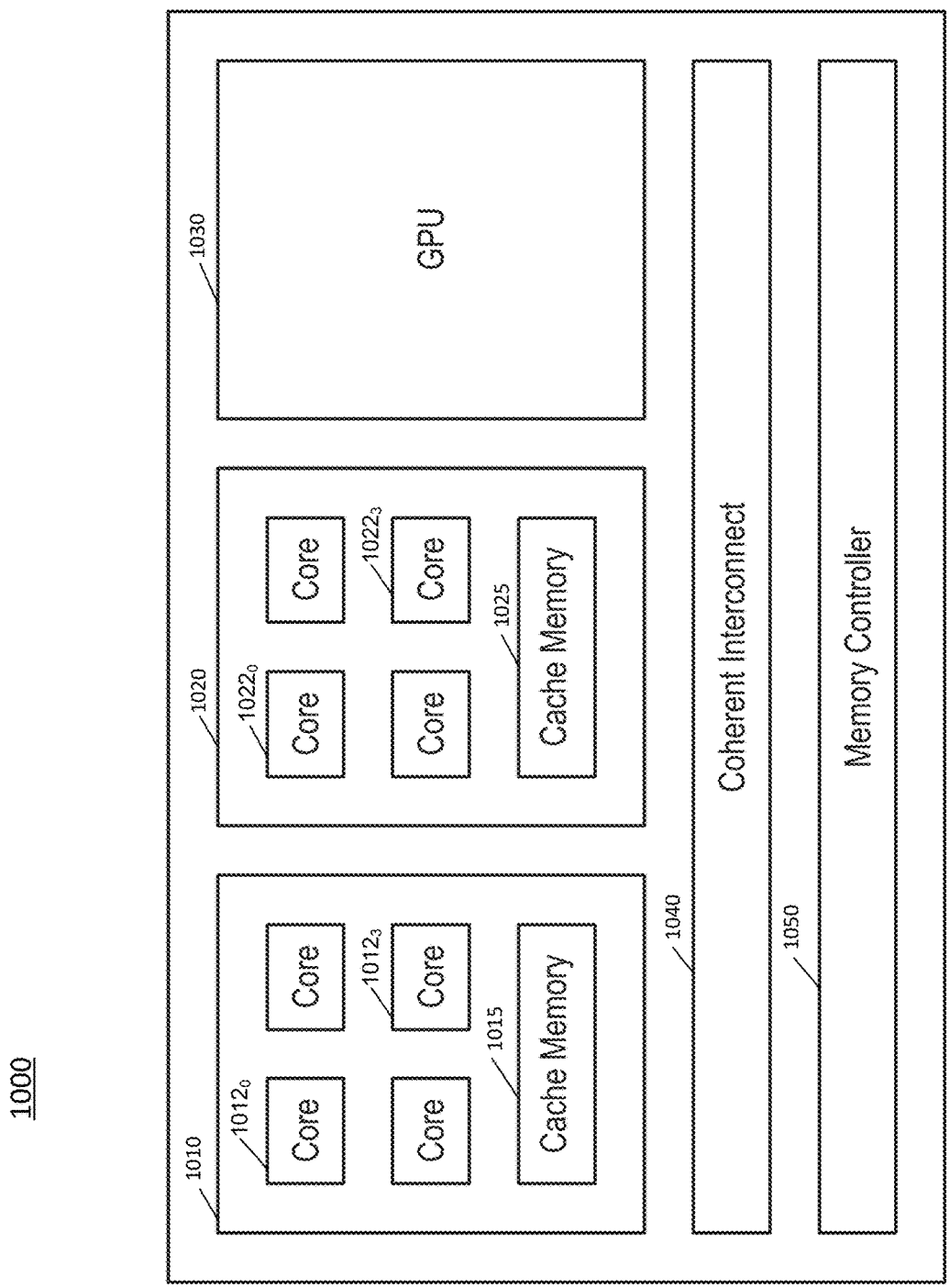
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
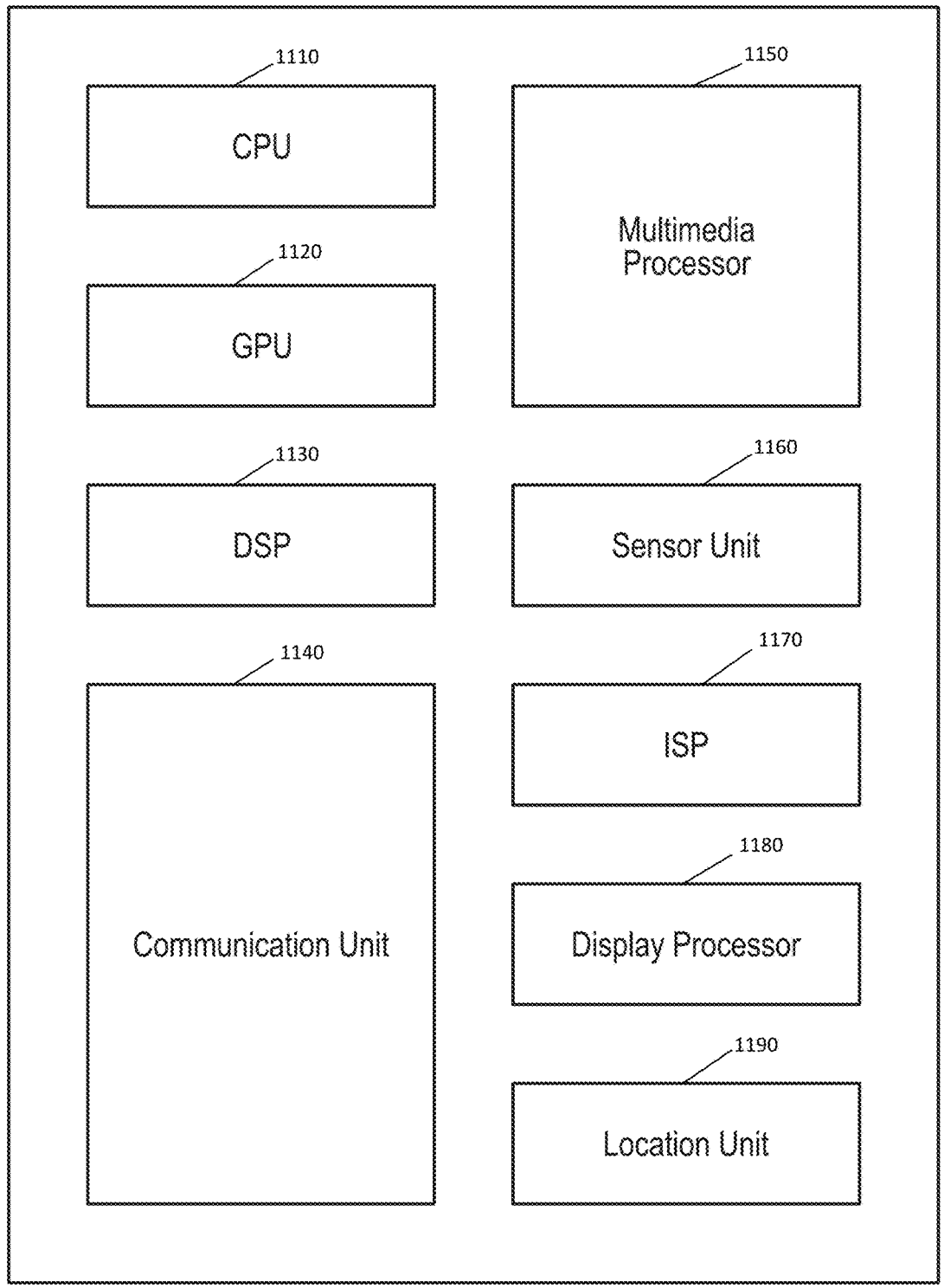
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area techniques such as Bluetooth™ IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
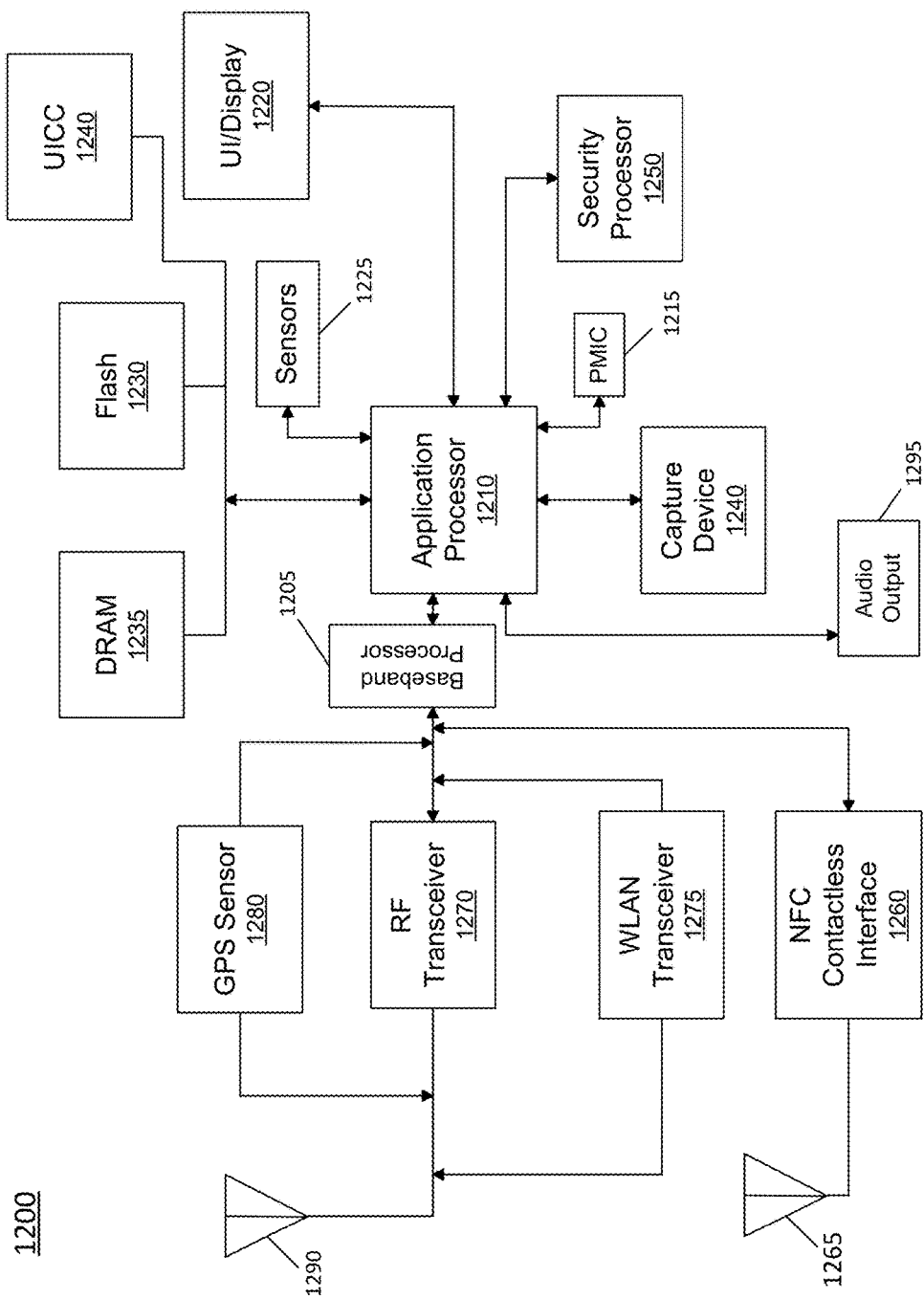
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications, such as according to a Bluetooth™ standard or an IEEE 802.11 standard such as IEEE 802.11a/b/g/n can also be realized.

Figure 13:
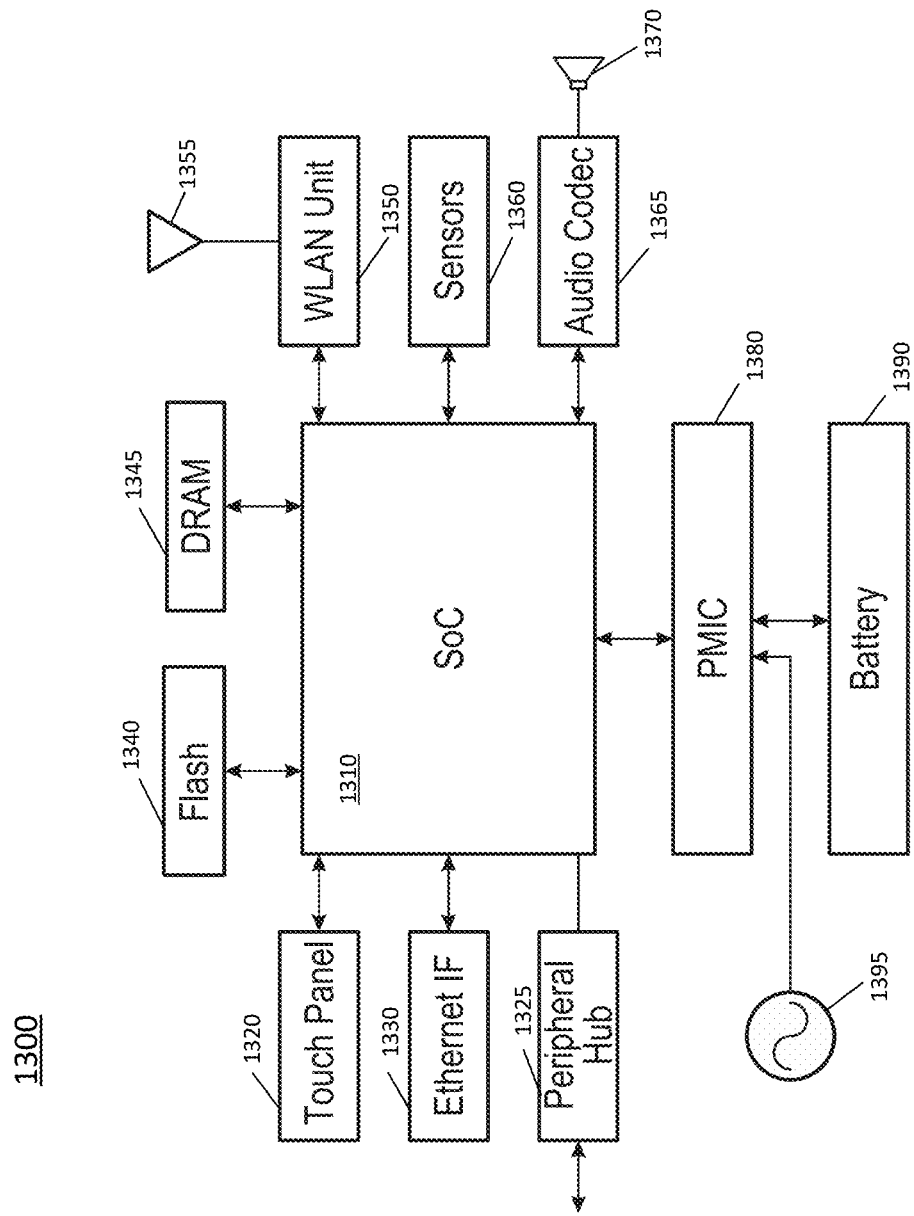
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols, including an IEEE 802.11 protocol, a Bluetooth™ protocol or any other wireless protocol.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
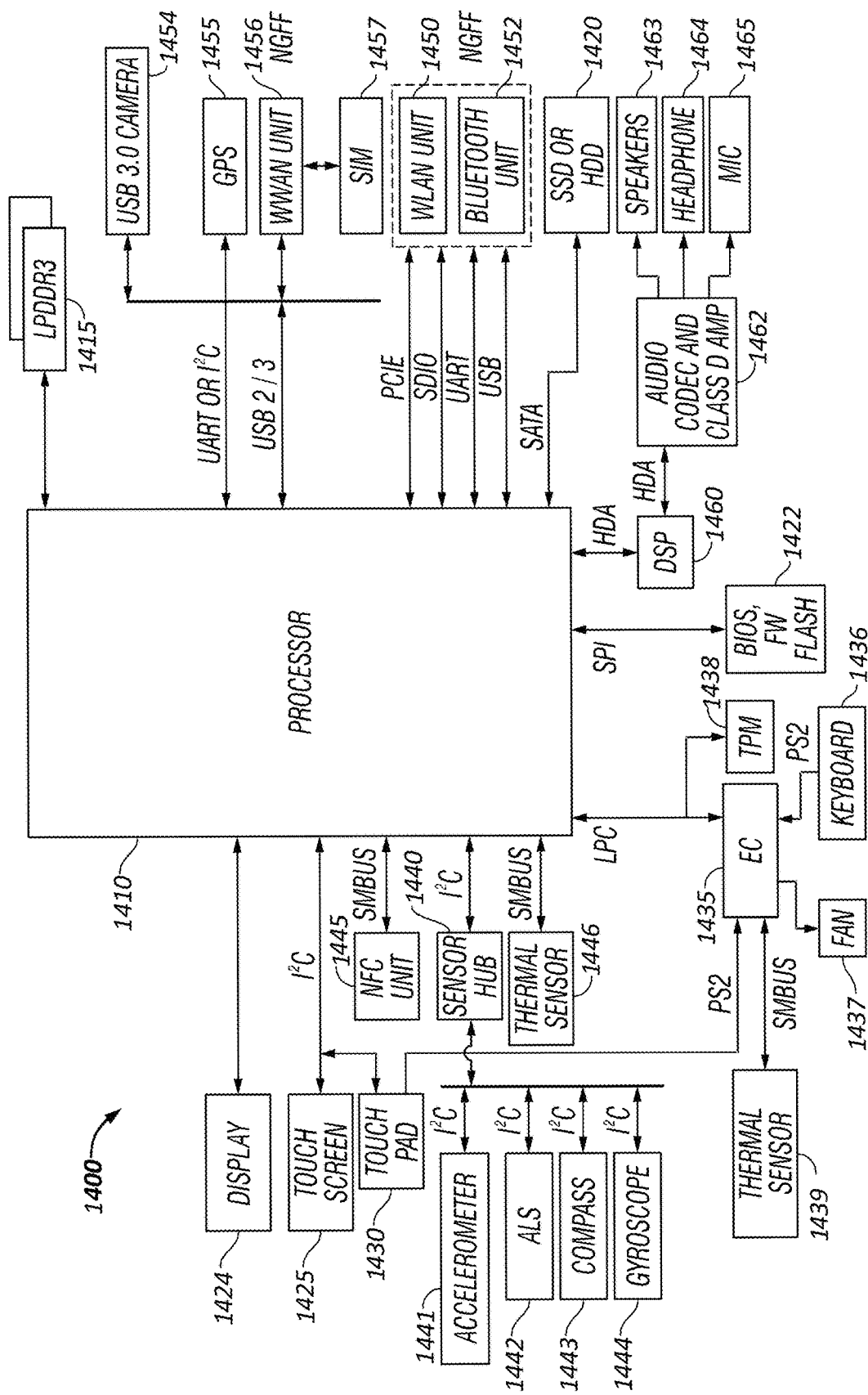
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I$^2$C interconnect. As further shown in FIG. 14, in addition to touch screen 1425, user input by way of touch can also occur via a touch pad 1430 which may be configured within the chassis and may also be coupled to the same I$^2$C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I$^2$C interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 in accordance with the Trusted Computing Group (TCG) TPM Specification Version 1.2, dated Oct. 2, 2003, may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications in accordance with a given IEEE 802.11 standard can be realized, while via Bluetooth unit 1452, short range communications via a Bluetooth protocol can occur. These units may communicate with processor 1410 via, e.g., a USB link or a universal asynchronous receiver transmitter (UART) link. Or these units may couple to processor 1410 via an interconnect according to a PCIe™ protocol or another such protocol such as a serial data input/output (SDIO) standard.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given USB protocol such as a USB 2.0 or 3.0 link, or a UART or I$^2$C protocol.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
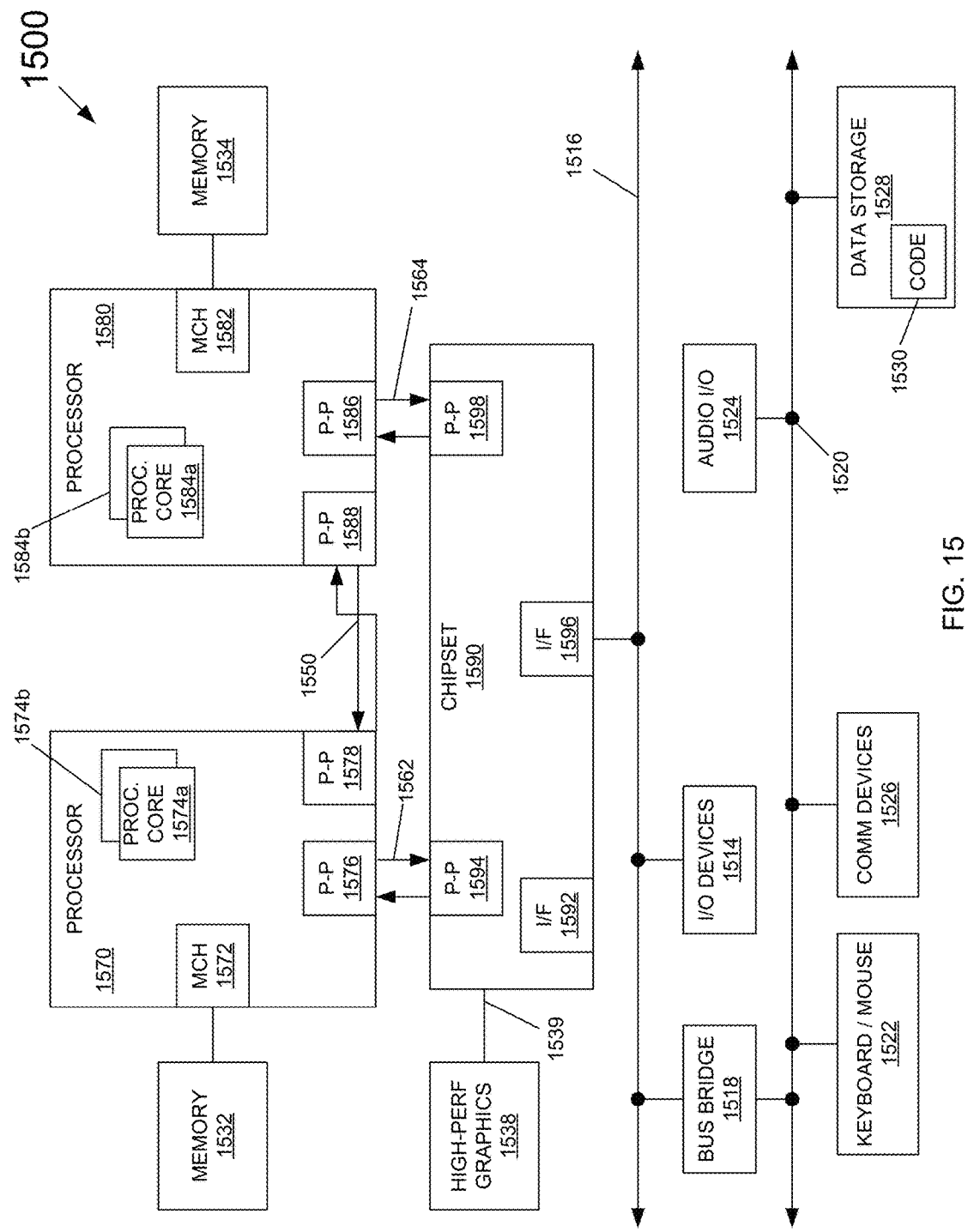
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574a and 1574b and processor cores 1584a and 1584b), although potentially many more cores may be present in the processors. Each of the processors can include a PCU or other power management logic to perform processor-based power management as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

A processor may have a plurality of domains, each domain having its own clock frequency. For example, a write domain (e.g., uncore of a processor) may run at a write clock frequency and a read domain (e.g., core of the processor) may operate at a read clock frequency. An operating system may decide to shut down one domain temporarily to change a clock frequency of the domain, e.g., in order to save power, while another domain of the processor remains active. The read domain may shut down in order to have its clock frequency adjusted, while the write domain remains active. For example, the read domain may be shut down in order to transition into state of reduced activity (e.g., smaller clock frequency) and reduced power consumption, e.g., one of several "P-states" of reduced activity.

According to embodiments, a back pressure scheme may be implemented between the write domain and the read domain of the processor. The back pressure scheme can enable writes to a buffer (e.g. payload bubble generator first in first out buffer (payload BGF)) within the write domain during a time period when the read domain is shut down. During shut down of the read domain, no packets stored in the payload BGF are read by the read domain. Upon restart of the read domain, packets that are stored in the payload BGF of the write domain can be read by the read domain.

The back pressure mechanism includes write source credit logic in the writer domain to maintain a count of write credits. Initially, a fixed number of write credits is supplied to the writer source credit logic from a BGF credit logic (BGF credit counter), e.g., within the read domain. Each write credit enables a write source to a write a data packet to the payload BGF, regardless of whether the read domain is active or shut down. Upon each write to the payload BGF, a write source credit counter in the write source credit logic is decremented. If the write source credit counter indicates that no write credits are available in the write domain, writes to the payload BGF are prohibited. With each read of the payload BGF, an additional write credit is supplied to the write source credit logic by the BGF credit logic. Use of write credits prevents overwriting of stored packets within the payload BGF.

In the discussion that follows, a value of "true" is represented by a numerical value of '1', and a value of "false" is represented by a numerical value of '0'. In other embodiments, "true" may be represented by '0' and "false" may be represented by '1' with no loss of generality regarding the concepts presented.

Each domain may have an associated bubble generator (BG) that generates a gating signal. That is, a write BG in the write domain generates a write signal (time slot valid write (TSVW)) that gates a write to the payload BGF) for each instance that the write clock has a value of '1'. When both the write BG and the write clock have a value of '1' and when the write source has a packet to write to the payload BGF, the write can occur. When either the write BG or the write clock has a value of '0' no write will occur to the payload BGF. In embodiments, the write to the payload BGF is further gated by write source credits, e.g., if no write source credits are available in the write domain (as determined by the write source credit logic) no write will occur.

If write source credits are available, upon the execution of the write to the payload BGF the count of source credits decrements by one.

The read domain has a read BG that gates each read, in combination with a read clock. That is, the read BG in the read domain generates a read signal (time slot valid read (TSVR)) that gates whether a read (e.g., from the payload BGF) is enabled for each instance that the read clock has a value of '1' (e.g., "true"). When the read BG outputs a '1' and the read clock outputs a '1', the read of the payload BGF is enabled (e.g., read is permitted during a "read window"). If either the read BG or the read clock has a value of '0', no read will occur. In some embodiments, a system of read credits may be employed to further gate whether reads of the payload BGF are enabled, e.g., if at least one read credit is available, a read of the payload BGF is permitted. Read credits may be issued by reader credits issuance logic within the read domain, and a count of read credits may be maintained by an egress (reader) credit counter in the read domain. The read BG has a read BG frequency (TSVR frequency) and the write BG has a write BG frequency (TSVW frequency). In embodiments, the read BG frequency and the write BG frequency are set such that, for each base clock cycle, there will be an equal number of write opportunities and read opportunities so as to maintain a steady state flow of packets from write domain to the read domain. In embodiments, the relationship between the read BG and the write BG is as follows: The domain with the slower domain clock frequency may be set to have a BG value (time slot valid (TSV)) of '1' (e.g., always 'true'), while for the domain with the faster domain clock frequency, the BG frequency is set to be proportional to a ratio of the domain frequencies, e.g., faster domain frequency/slower domain frequency. This proportionality scheme enables an equal number of read opportunities ("read windows") and write opportunities ("write windows") for each base clock cycle.

Additionally, in embodiments, the write domain has a valid BG FIFO buffer (valid BGF) that includes a valid FIFO buffer ("valid FIFO" herein) to store a value ("valid indicator") for each write domain clock cycle when the write BG has a value of '1'. For a given write domain clock cycle, if the write source writes a packet to the payload BGF, the valid indicator has a value of '1' and is stored in the valid FIFO. If the write source does not write a packet to the payload BGF, the valid indicator has a value of '0' and is stored in the valid FIFO. When the write BG has a value of '0' no values are stored in the valid FIFO.

In embodiments, during a shutdown of the read domain, both the read BG and the write BG are shut down, e.g., TSVW and TSVR maintain a constant value of '0.' Thus, no reads of the payload BGF are possible. Although no writes are done to the valid FIFO, the write source can continue to write packets to the payload BGF. While the write BG is shut down a write accumulator in the valid BGF stores (e.g., accumulates) a valid indicator for each write to the payload BGF (e.g., each valid indicator has a value of '1').

The TSVs are stopped by resetting the BGs. After the P-state transition ends and a new clock frequency is established in one (or both) of the read and write sides, TSVR and TSVW can be restarted. The valid BGF and the payload BGF will start to operate from the same corresponding locations as indicated by their corresponding pointers prior to the P-state transition shut-down.

Figure 16A:
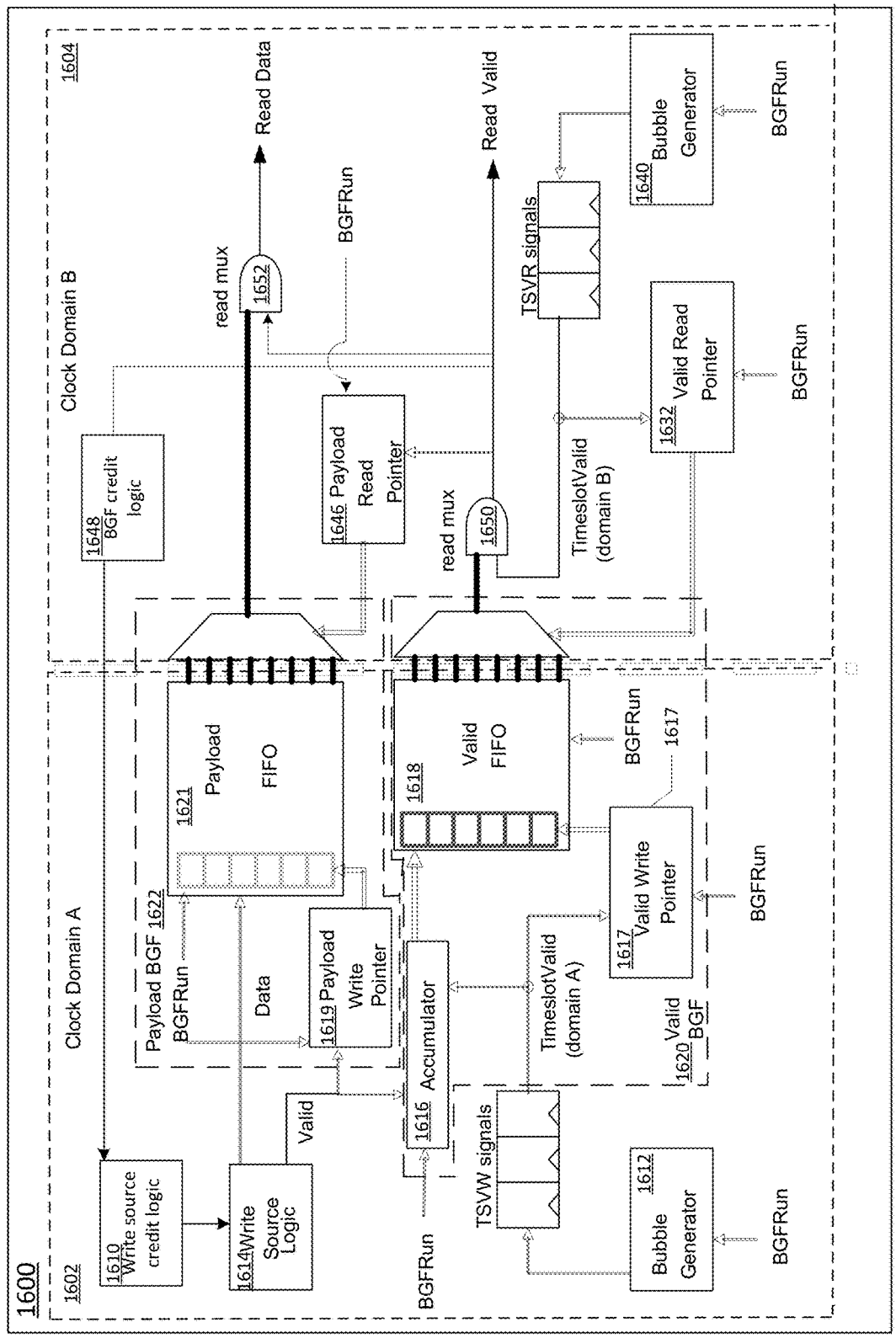
FIG. 16A is a block diagram of a processor, according to embodiments of the present invention.

FIG. 16A is a block diagram of a processor 1600, according to embodiments of the present invention. The processor 1600 includes a clock domain A 1602 that operates at a clock frequency A and a clock domain B 1604 that operates at a clock frequency B. The clock domain A 1602 includes a bubble generator (BG) 1612, write source credit logic 1610, write source logic 1614, a payload bubble generator first in first out buffer (payload BGF) 1622 that includes a payload write pointer 1619 and a payload first in first out buffer (payload FIFO) 1621, and a valid BGF 1620 that includes a valid write pointer 1617 and a valid FIFO 1618. The clock domain B 1604 includes a bubble generator (BG) 1640, a valid read pointer 1632, a payload read pointer 1646, read mux 1650, read mux 1652, and BGF credit logic 1648. The processor 1600 also includes one or more cores (not shown), a power control unit (not shown), and may include other hardware, software, and/or firmware logic (not shown), caches, etc.

In operation, a BGF run signal received from, e.g., a power control unit (PCU) (not shown) starts bubble generator (BG) 1612 and BG 1640. The write domain clock enables, for each 'true' value of the write clock, the write logic 1614 to write a data packet (if there is a data packet to be written) to the payload FIFO 1621 at a location indicated by a payload write pointer 1619 that increments its pointer address with each write.

The write bubble generator 1612 is to provide time slot valid write (TSVW) signals. A write window occurs when both the TSVW signal and the write clock are 'true', e.g., each has a value of '1'. When each write window occurs, the write source logic 1614 sends a corresponding valid indicator to the valid BGF 1620. Each valid indicator has a value to indicate whether a data packet is to be written to the payload FIFO 1621, e.g., the valid indicator has a value of '1' to indicate that a data packet is being written to the payload FIFO 1621 during the write window, or a value of '0' to indicate that no data packet is being written to the payload FIFO 1621 during the write window. If the write bubble generator 1612 is shut down (e.g., during shutdown of the clock domain B 1604), the write logic 1614 can still write data packets to the payload FIFO (each write gated by the write clock), and an indication of each data packet that is written to the payload FIFO may be stored in an accumulator 1616.

The bubble generator 1612 and the bubble generator 1640 are configured to produce time slot valid signals (TSVW and TSVR, respectively), and they can be configured to gate activity in their respective domains, so that writes and reads occur at an equal rate for each base clock cycle. For instance, in an embodiment, the clock domain A 1602 operates at a clock frequency A that is faster than the clock frequency B of clock domain B 1604. The clock domain B, having the slower clock frequency, can be configured to produce a TSV signal that is enabled constantly (value of '1'), so that the clock frequency B gates performance of actions (e.g., reads of the payload FIFO 1621) in the domain B. The clock domain A (with the faster clock frequency) produces TSV signals that gate actions and, coupled with the clock frequency A, enable actions to be performed at a same rate that as the domain clock frequency B.

As an example, the processor has a base clock frequency of 100 MHz, the clock domain B has a clock frequency B of 300 MHz, and the clock domain A has a clock frequency A of 500 MHz. In one base clock cycle, clock domain B has 3 clock cycles and clock domain A has 5 clock cycles. Bubble generator 1640 may produce a constant signal so that each of the 3 clock cycles gate actions within the clock domain B during one base clock cycle. Bubble generator 1612 may produce TSVWs that, in combination with the 5 clock cycles of clock frequency A, also gate 3 clock cycles in clock domain A (e.g., TSVW has a 'false' value during two of the five frequency A clock cycles and a 'true' value during three of the five frequency A clock cycles within one base clock cycle). By selection of an appropriate bubble generator frequency of the domain with the higher clock domain frequency, both domains can be made to execute reads/writes at the same rate within each base clock cycle.

In embodiments, when the bubble generator 1612 is operational, the valid write pointer 1617 and the valid read pointer 1632 are to commence with a pointer separation N that is to remain constant, e.g., to prevent both read-after-write instability and write-after-read instability. The valid write pointer 1617 points to a current location within the valid FIFO 1618, the current location that is to store a valid indicator that indicates whether a corresponding location within the payload FIFO 1621 stores a data packet. The value of the valid indicator written is '1' when a data packet is to be stored in a sequentially next location in the payload FIFO 1621. The value of the valid indictor written is '0' when no data packet is to be written to the payload FIFO 1621 during the current write window. For example, when a write of the data packet to the payload FIFO 1621 is to occur, the valid indicator has a value of '1' and is written to corresponding to the current location in the payload FIFO 1621 that is to store the data packet. The valid write pointer 1617 is advanced upon each write window. The payload write pointer 1619 is advanced responsive to an indication that a write to the payload FIFO 1621 is to occur. The valid write pointer 1617 and the valid read pointer 1632 maintain pointer separation between writes and reads of the payload FIFO 1621.

Write source credit logic 1610 stores write credits and/or maintains a count of write credits received. For each write by the write source logic 1614 to the payload 1621, a write credit is used and the count of write credits is decremented.

The valid BGF 1620 includes an accumulator 1616 that inputs to the valid FIFO 1618 and enables valid indicator values (e.g., '1's) to be written to the valid BGF 1620 faster than the TSVW cycles occur. For example, if the write logic 1614 writes in a write clock cycle (e.g., of clock domain A) when TSVW is not true, the accumulator 1616 is incremented, but no write to the valid FIFO 1618 occurs.

When a TSVW signal is true (value of '1'), if no data packet is to be written to the payload FIFO 1621 and if the accumulator is non-zero, a '1' will be written into the sequentially next location in the valid FIFO 1618 and the accumulator will be decremented (e.g., the '1' is transferred from the accumulator to the valid FIFO 1618). If a TSVW true cycle occurs and if there is no write of a data packet to the payload FIFO 1621 from the write logic 1614, and no previously accumulated writes (e.g., the accumulator has all zeros, and so there are no stored packets in the payload FIFO 1621), a 0 is written to the valid FIFO 1618.

In embodiments, the write logic 1614 is to be halted if all write credits have been depleted. An initial allotment of write credits may be equal to a capacity of the payload FIFO 1621 (and equal to a capacity of the valid FIFO 1618). The accumulator 1618 may be sized according to a size of the valid FIFO 1618. For example, in one embodiment the accumulator 1616 may be equal in capacity to the valid FIFO 1618. (Additionally, the accumulator is not to decrement below zero.)

Reading of the valid FIFO 1618 may be done in each read clock cycle of the read clock domain 1604 in which the bubble generator 1640 signals a time slot valid read (TSVR). The valid read pointer 1632 moves after each read. As '1's exit the valid FIFO 1618 and enter a read mux 1650, the '1's may enable read of data packets from the payload FIFO

1621 (as indicated by the payload read pointer 1646), via read mux 1652, and/or may increment a counter (not shown), e.g., when read credits are implemented and reads are delayed (read credits are discussed below). Each instance of a read of the payload FIFO 1621 occurs when the valid indicator read from the valid FIFO 1618 is '1' and is input to the read mux 1650 with a second input (TSVR signal). In embodiments, when both inputs of the read mux 1650 are true, the read of the payload FIFO 1621 occurs via read mux 1652, and BGF credit logic 1648 issues a write credit to the write source credit logic 1610, which enables another write to occur at a future write window.

The valid read pointer 1632 is initialized to be "N" less than the valid write pointer 1617, where N is the pointer separation. In some embodiments, a size of the valid FIFO 1618 is at least twice the separation between the valid read pointer 1632 and the valid write pointer 1617, to allow for skew in both directions, e.g., to prevent read after write instability, and write-after-read instability. The valid read pointer 1632 and the valid write pointer 1617 move continuously, so there is typically no overlap. Instability is typically avoided by virtue of the fact that the pointers are always separated. A time delay between writing to any given valid FIFO location and reading the valid FIFO location is governed by the pointer separation. When the valid FIFO 1618 is stopped (BGFRun signal is lowered), the valid write pointer 1617 is typically reset to point to a first entry and valid FIFO slave latches are reset.

Physically, a payload FIFO such as payload FIFO 1621 may be similar to a valid FIFO. The main difference is in how the write and read pointers operate, e.g., both the write pointer and the read pointer of a payload FIFO start at 0. In embodiments, writes to the payload FIFO only occur when there is a packet to be written and when there are payload credits available. Unlike the valid FIFO, where the valid write pointer increments every time there is a write window, in the case of the payload FIFO the write pointer increments only when a data packet is written to the payload FIFO. Reads of the payload FIFO occur when the output of the valid FIFO indicates that there is valid data in the payload FIFO. Pairing the payload FIFO with the valid FIFO ensures that the write pointer is ahead of the read pointer before the read occurs, preventing metastability and allowing for clock skew.

In embodiments, the valid FIFO/payload FIFO combination operates as follows:
  Writes are made only when payload credits are available.
  Writes are to the next payload FIFO location, and the write pointer is incremented.
  When the writer source has a packet, a '1' is sent into the valid FIFO, which will cause the packet to be written into the payload FIFO in the next write window.
  On the reader side, when the output of the valid FIFO is a '1', data in the payload FIFO is available to be read.

In various embodiments, the back pressure mechanism (e.g., use of write credits) enables the writer side to write packets to the payload FIFO only when the writer side has credits. The writer side will receive a credit only if there is an empty location in the payload FIFO. Each time the reader side reads from the payload FIFO a location in the payload FIFO is vacated, and the reader side will send a credit to the writer side.

Figure 16B:
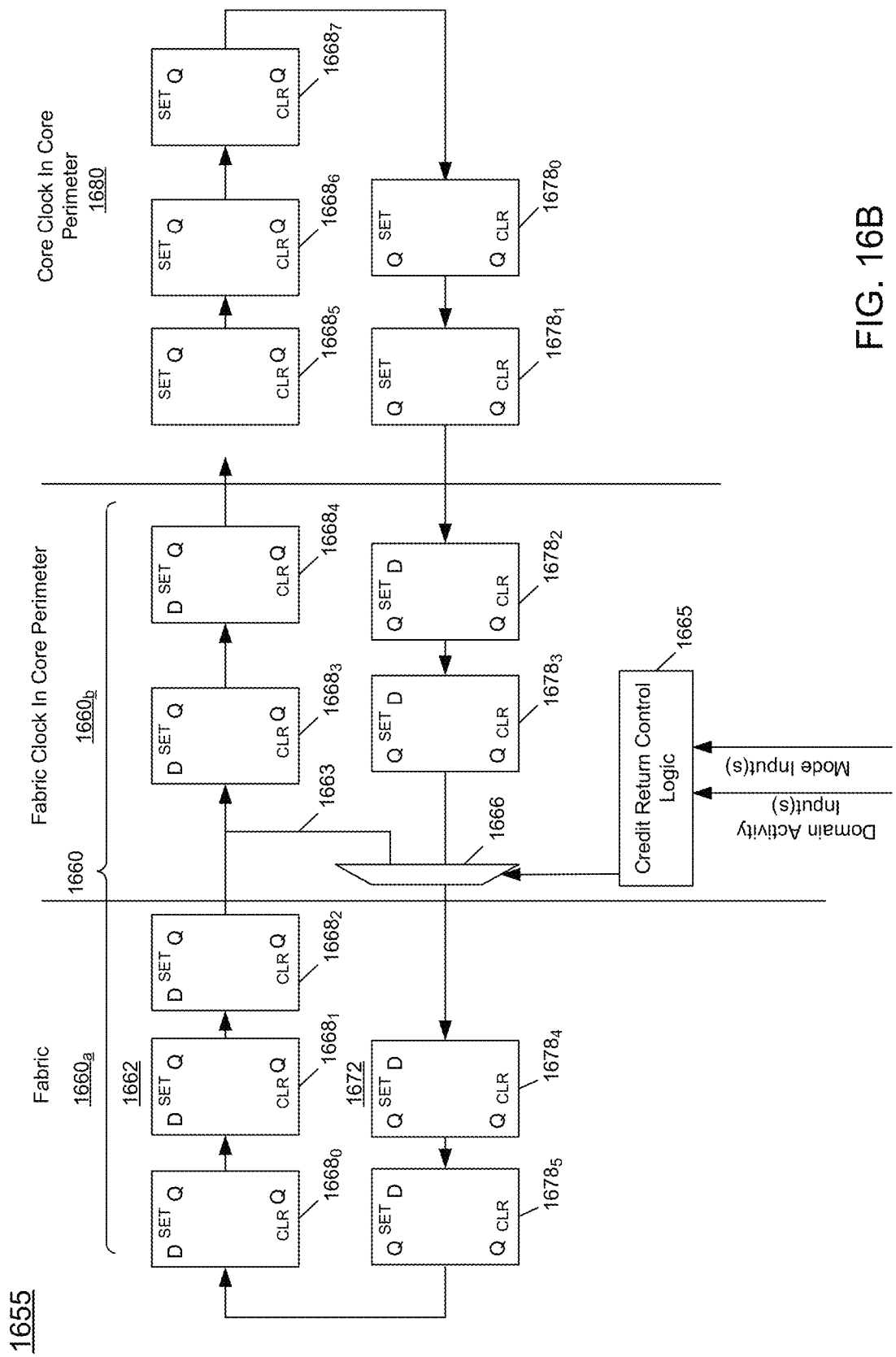
FIG. 16B is a block diagram of a credit circuit in accordance with an embodiment of the present invention.

Referring now to FIG. 16B, shown is a block diagram of a credit circuit in accordance with an embodiment of the present invention. In various embodiments, the credit circuit may be part of a buffer interface for a buffer coupled between two or more clock domains. As shown in FIG. 16B, credit circuit 1655 is formed as a loopback path, generally referred to as a loop, having a first path 1662 and a second path 1672. As seen, each of these paths traverses portions of two different domains, namely a writer domain 1660 and a reader domain 1680. In the embodiment shown, paths 1662, 1672 each may be formed of a plurality of delay elements, namely delay elements $1668_0$-$1668_7$ and delay elements $1678_0$-$1678_5$. In the embodiment shown, each delay element may be implemented as a D-type flip-flop. However understand the scope of the present invention is not limited in this regard and in other embodiments, other types of delay elements such as other types of flip-flops or other delay components are possible. Furthermore, while in the particular embodiment shown, first path 1662 includes eight delay elements and second path 1672 includes six delay elements, understand that the scope of the present invention is not limited in this aspect and different numbers of delay elements can be present in each of the paths. In some cases, equal numbers of delay elements may be present in each of the paths.

To provide credit information by way of credit circuit 1655, the paths are arranged such that the credit information is provided by way of the clock input to the flip flops. Note that writer domain 1660 includes a first portion 1660*a* that may operate at a first clock frequency. In an embodiment in which credit circuit 1655 is for uncore-to-core (U2C) communication, first portion 1660*a* of writer domain 1660 may be present in a fabric domain. In turn, a second portion of writer domain 1660, namely second portion 1660*b*, may similarly operate at the same clock frequency as first portion 1660*a* and may, in an embodiment, be present in a core perimeter logic, which may be part of the fabric domain. In turn, reader domain 1680 similarly may be present within the core perimeter logic and may execute at a core clock frequency. In different embodiments, the fabric domain may be implemented, at least in part, as a ring or mesh. Further, while embodiments are described in the context of a core, understand that a buffer interface as described herein may be equally useful for other processing elements (e.g., FPGA, GPU, DSP, ASICs, etc.).

Note that in some cases, the circuitry of credit circuit 1655 generally illustrated at 1660 may be present in write source credit logic 1610 of FIG. 16A and in turn, the circuitry of credit circuit 1655 generally illustrated at 1680 may be present in BGF credit logic 1648 of FIG. 16A. Understand while shown at this high level in the embodiment of FIG. 16B, a credit circuit may take other forms in other embodiments.

With regard to operation of the full credit loop formed of all of first path 1662 and second path 1672, inside core perimeter 1660*b*, the data is flopped and then after one or more cycles of pointer separation (namely separation between read and write pointers), the data is transferred to reader domain 1680. After data is sampled on the reader side, a credit indication is pushed to a BGF in reader domain 1680. From there, this credit indication is transferred to fabric domain 1690, where it is more specifically sent out of core perimeter 1660*b* to first portion 1660*a*. On the write side of core perimeter 1660*b*, it is known exactly when data will be consumed by the reader side based on the BGF TSV indication. By knowing when the data will be consumed, the need to communicate corresponding credit information from the reader side through the full credit loop is avoided. For special modes, however, the full credit loop can be activated.

To enable reduced latency, power consumption and area for BGFs as described herein in these cases where read activity is known a priori, a bypass path 1663 couples between first path 1662 and a selection logic 1666, which, may be implemented as a multiplexer in an embodiment. While bypass path 1663 is shown to couple from an output of delay element 1668₃, understand that in other embodiments this bypass path may originate from another location of first path 1662. In some embodiments, the placement of this bypass path may be based at least in part on relative frequencies between the two different domains. In some cases, a configurable location for the bypass path may be provided to enable control logic to dynamically control configuration of the bypass path based on operating frequencies of the two domains. Thu embodiments may adaptively regulate backpressure (i.e., controlling write credit availability by varying the return latency) in a credit-based flow controlled interface based on one or more operating parameters. Although the scope of the present invention is not limited in this regard, such parameters may include: a power state of the processing element; an expected data consumption rate of the processing element; a frequency of the second clock domain, among others.

In the embodiment shown, selection logic 1666 is controllable by a credit return control logic 1665 to output credit information received via bypass path 1663 or from second path 1672 (and more specifically the output of delay element 1678₃). As will be described herein, in embodiments credit return control logic 1665 may be configured to controllably enable bypass path 1663 when both domains are active in normal operation. Control logic 1665 may determine activity state, in an embodiment, based at least in part on activity input information received from the domains, namely domain activity inputs. Further inputs may include mode inputs, as similar control of bypass path enabling may be based upon certain processor modes of operation. For example, bypass path 1663 may be controlled to be enabled for certain test modes such as a debug mode or so forth.

In various embodiments, credit return control logic 1665 is configured for the following: enabling bypass path 1663 and immediate credit release within the writer side when the reader side is operating at a faster rate than the writer side; enabling bypass path 1663 and applying a dynamic delay before releasing credit information, when the reader side is operating at a slower rate than the writer side; and disabling bypass path 1663 for cases when operation and/or activity of the reader side is not defined or cannot be determined a priori. Such cases may include operation during a frequency change, entry into a low power state, a debug state or other test modes, and so forth.

In an embodiment, the dynamic delay period may be based at least in part on: read side frequency; write side frequency; transfer latency; and data consume latency. Credit information may be caused to leave reader domain 1680 when it is ensured that the next write for this credit will happen only when data were consumed. With this information, for cases when reads occur faster than writing, the data is consumed always and thus the credit information can proceed in the short loop without delay. For cases when the reader side is slower than the writer side, this dynamic delay period may be calculated.

Figure 17:
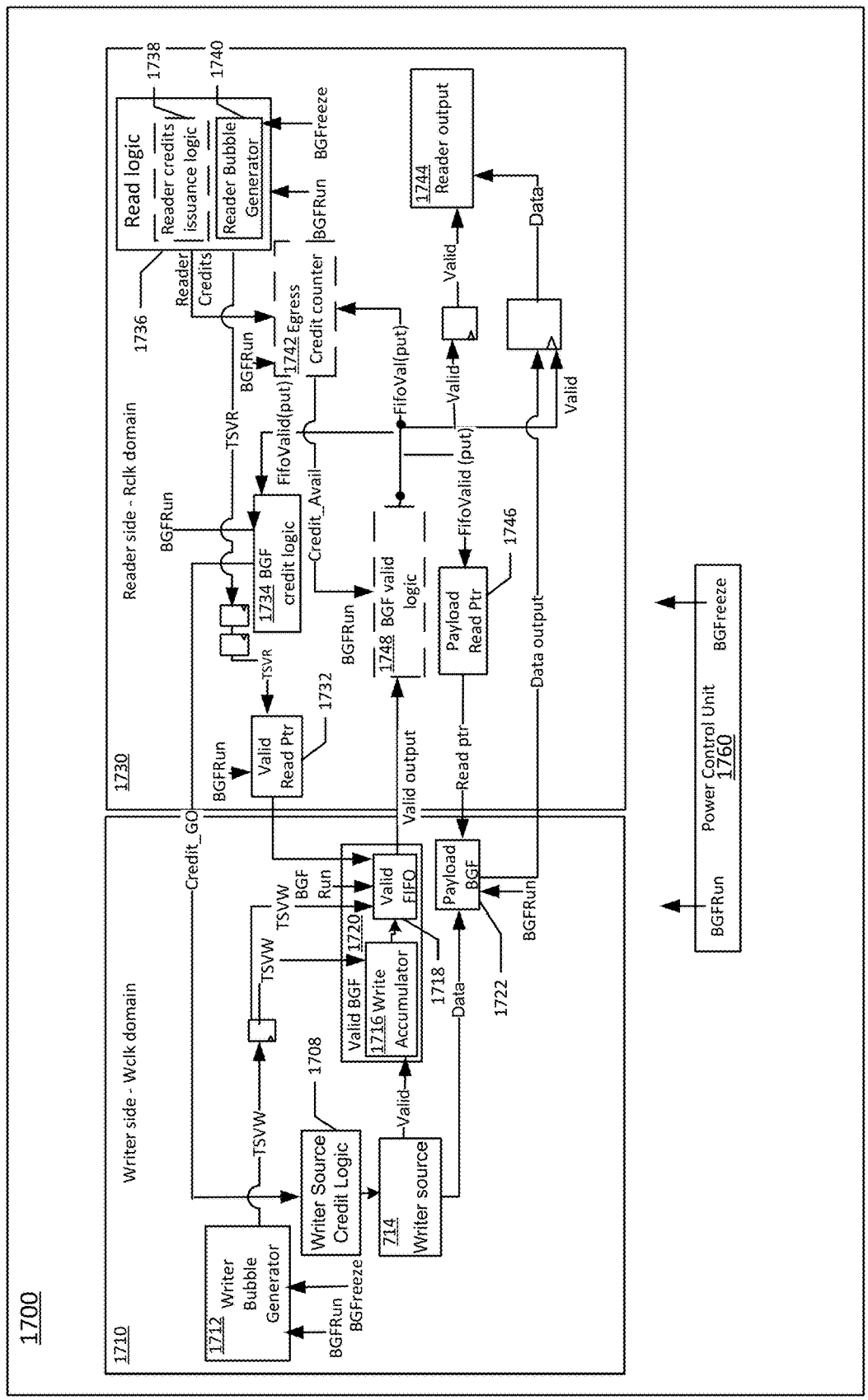
FIG. 17 is a block diagram of a processor, according to embodiments of the present invention.

The back pressure mechanism may be implemented in various ways. FIG. 17 is a block diagram of a processor, according to embodiments of the present invention. The processor 1700 includes a power control unit 1760, a write side logic (generally referred to as a writer side) 1710, a read side logic (generally referred to as a reader side) 1730, and one or more cores (not shown). In an embodiment, the writer side 1710 includes at least a portion of an uncore portion of the processor 1700, and the reader side 1730 ("core portion") includes one or more cores. In other embodiments, the writer side 1710 includes one or more cores and the reader side 1730 includes at least a portion of the uncore portion of the processor 1700.

The PCU 1760 may issue a BGFRun signal that enables write and read of packets. (In embodiments, the BGFRun signal may reset writer BG 1712, reader BG 1740, and of writer source credit logic 1708). BGF credit logic 1734 in the reader side 1730 initially sends write credits to writer source credit logic 1708 in the writer side 1710. The initial number of write credits sent is equal to a capacity of a payload BGF 1722 (and in some embodiments may be equal to a capacity of a valid FIFO 1718 and to a capacity of a write accumulator 1716), and ensures that writer source 1714 will not overflow the payload BGF 1722 if no reading is done by the reader side 1730. In the reader side 1730, each time a payload read pointer 1746 reads a packet from the payload BGF 1722, the BGF credit logic 1734 sends a write credit to the writer source credit logic 1708 in the writer side 1710.

When the writer source 1714 is to write a data packet to the payload BGF 1722 during a write window (e.g., a writer domain clock signal Wclk has a value of '1' while a writer BG 1712 outputs a 'true' signal), the writer source 1714 is to send a valid indicator having a value of '1' to a valid BGF 1720, to be stored in a valid FIFO 1718. When no data packet is to be written during the write window, the writer source 1714 is to send the valid indicator having a value of '0' to the valid BGF 1720 to be stored in the valid FIFO 1718. The writer source 1714 can also write one or more data packets to the payload BGF 1722 when Wclk has the value of '1' and when the BG 1712 is shut down (TSVWs have e.g., 'false' signal), and the writer source 1714 is to send an indication of the write to the valid BGF 1720 to be stored in the write accumulator 1716.

During a read window (e.g., a reader domain clock signal Rclk has a value of '1' while a reader bubble generator 1740 outputs a 'true' signal) a valid read pointer 1732 advances to a sequentially next location in the valid FIFO 1718 and the valid indicator in the location pointed to by the valid read pointer 1732 is read. (In some embodiments the valid indicator is optionally input to BGF valid logic 1748, which gates advancement of the payload read pointer 1746 based on availability of read credits, discussed below). If the valid indicator has a value of '1', e.g., an entry is to be read from the payload BGF 1722, the payload read pointer 1746 is advanced, the entry (data packet) is de-allocated from the payload BGF 1722 to reader output 1744 and the BGF credit logic 1734 sends an additional credit to the writer source credit counter 1708. If the valid indicator is '0', no data packet is read from the payload BGF 1722 and the payload read pointer 1746 is not advanced, unless an indication is stored in the write accumulator 1716, e.g., associated with a write that occurred during shutdown of the writer BG 1712, which may have occurred during a shutdown of the Rclk (for instance, in order to transition the reader side 1730 to a P-state). If an indication, associated with a data packet stored in the payload BGF 1722, is stored in the write accumulator 1716, on resumption of the Rclk the write accumulator 1716 writes to the valid FIFO 1718 a corresponding valid indicator with a value of '1' (e.g., 'true') and decrements a count of indications in the write accumulator 1716. The valid read pointer 1732 reads the valid indicator that has been written to the valid FIFO 1718 by the write accumulator 1716, the payload read pointer 1746 is advanced, and the stored packet is read from the payload BGF 1722.

Inputs to the BGF credit logic 1734 include:

FIFOVal—when this signal is high (e.g., 'true'), an entry is going to de-allocate from the Payload BGF, because the FIFO Val signal causes a "read" from the Payload BGF (by advancing the payload read pointer 1746). When the FIFOVal signal is high, a credit is sent to the writer source credit logic 1708. The FIFOVal signal can be the output of the valid BGF logic 1720, or can be an output of the BGF Valid logic 1748 if reader credits are implemented.

BGFRun—the BGF credit logic 1734 starts to work when the BGFRun signal (issued by the PCU 1760) activates, and stops when a BGFreeze signal (issued by the PCU 1760) is issued. When the BGFRun signal first rises, the BGF credit logic 1734 sends credits to the writer source credit logic 1708 in an amount determined by a size of the payload BGF 1722. For example, the number of credits initially sent to the writer source credit logic 1708 may be equal to a number of storage locations within the payload BGF 1722.

TSVR and TSVW signals. An additional write credit is issued to the writer source credit logic 1708 responsive to each read of a '1' value of a valid indicator in the valid FIFO 1718, which occurs when TSVR and TSVW signals are being generated with values of 'true'. During shutdown of the reader side 1730 (e.g., to transform to a P-state) no TSVR signals or TSVW signals are generated (e.g., TSVR and TSVW both have a value of 'false'), and no credits are transferred from the BGF credit logic 1734 to the writer source credit logic 1708. During the shutdown of the reader side 1730, the count of write credits in the writer source credit logic 1708 decrements upon each write of a data packet to the payload BGF 1722.

Output from the BGF credit logic 1734 is Credit_GO, and is input to the writer source credit logic 1708. Each time there is a credit to send to the write source 1714 (whether due to the BGF credit logic 1734 having started working, or because an entry in the Payload BGF 1722 is de-allocated), the Credit_GO signal is high (e.g., value of 'true') for one reader clock cycle.

In operation, a P-state transition can occur in the writer side 1710 or the reader side 1730, and causes the clock in the side in which the P-state transition occurs to stop, change clock frequency, and re-start. In embodiments, the BGFs are not drained while the clock in the side in within the P-state transition occurs is stopped. Further, the pointers to each BGF (e.g., valid BGF and payload BGF) are not reset during the P-state transition. Instead, contents of the payload BGF and valid BGF are maintained, and corresponding pointers are maintained as they were prior to stopping of the clock in the side in which the P-state transition occurs.

In embodiments of the present invention, the P-state transition in one domain can occur without informing the other domain and without draining the BGFs. In embodiments, there is a fixed pointer separation between the valid write pointer and the valid read pointer. The pointer in either side advances each time that side gets a TSV. According to embodiments of the present invention, when it is known that one side wants to stop and change its clock, TSVs in both sides are halted at the same time by sending a "BGFreeze" signal to two bubble generators 1712, 1740 (e.g., simultaneously), which stops TSV generation. When no TSVs are to arrive at the valid BGF 1720 (and when read credits are employed, at the BGF valid logic 1748), the pointers 1732, 1746 will freeze, e.g., no data will be read, and no credits will be sent from the BGF credit logic 1734 back to the writer source credit logic 1708. Meanwhile, the writer source 1714 can continue to write to the payload BGF 1722 because the writer source 1714 does not need TSVWs until its write credits are fully depleted. The data will be kept inside the payload BGF 1722, and the valid indicators (each having a value of '1') will be temporarily stored inside the valid BGF write accumulator 1716. The count of write credits in the writer source credit logic 1708 is decremented for each write of a data packet to the payload BGF 1722.

One of the sides can stop its clock and enter a P-state, and start its clock again with a new clock ratio between domain clocks. Because both write and read bubble generators (BGs) are stopped, a new configuration (e.g., clock ratio) can be sent to both BGs, and they will begin to generate new TSVs with the new configuration. The valid FIFO 1718 will start to receive TSVs and will continue outputting from the storage location where it stopped. If there are valid indications (e.g., value '1' to indicate that a data packet is stored) that are stored in the write accumulator 1716, the stored valid indications are pushed to the valid FIFO 1718. When the valid indications are output from the valid FIFO 1718, they will cause the payload read pointer to advance and each corresponding packet is de-allocated out to the reader output 1744, and each read also causes a corresponding write credit to be sent from the BGF credit logic 1734 to the writer source credit logic 1708.

In another embodiment where flow of data packets is from core domain to uncore domain, the data packets are generated in the core domain, which will undergo the P-state transition. The PCU 1760 stops packet flow from the core domain to the uncore domain during a P state transition. Therefore, the payload BGF and valid BGF do not operate during P-state transitions.

In some embodiments, reader credits are implemented to control access by the reader side 1730 to the data packets stored in the payload BGF 1722. Reader credits issuance logic 1738 within read logic 1736 issues reader credits to an egress (read) credit counter 1742. If one or more reader credits are available to the BGF valid logic 1748, and if the output of the valid FIFO 1718 has a value of '1', the payload BGF pointer 1746 is advanced and the corresponding data packet is de-allocated from the payload BGF 1722, and the count of reader credits is decremented within the egress credit counter 1742. If no read credits are available (as determined by the egress credit counter 1742), advancement of the payload read pointer 1746 is stalled until additional read credits are issued by the reader credits issuance logic 1738.

In embodiments that employ read credits, the BGF valid logic 1748 counts valid indicators, (e.g., value of '1') from the Valid BGF 1720 and permits each valid indicator with a value of '1' to go to the payload read pointer 1746 if there are read credits available to permit reads. Inputs to the BGF valid logic 1748 are:

ValBGF—this is the output of the valid FIFO 1718, e.g., a 'valid' signal from the writer source 1714 that crosses from the writer side 1710 to the reader side 1730, indicating whether there is a valid packet in the payload BGF 1722 (e.g., when the ValBGF has a value of '1' there is a corresponding data packet written in a corresponding location of the payload BGF 1722).

Credit_Avail—this signal is high as long as there are read credits available corresponding to one or more reads.

BGFRun—BGF valid counter 1748 module starts when BGFRun is true.

The BGF valid logic 1748 outputs a FifoVal signal. If there are reader credits, no 'stall' is required and a 'valid'

(e.g., value of '1') received from writer side 1710 allows a read of the payload BGF associated with the FifoVal signal to be delivered to the reader output 1744 If there are no reader credits available, but a 'valid' is received from the writer side 1710, the 'valid' count is to be maintained in a read accumulator (not shown) e.g., within the BGF valid logic 1748 and read of the payload BGF location corresponding to the FifoVal is to be delayed until there are reader credits.

Egress (Read) Credit Counter 1742 counts read credits issued by the reader credits issuance logic 1738 of read logic 1736, and the Egress Credit Counter 1742 controls the BGF valid logic 1748. The Egress Credit Counter 1742 keeps track of the number of read credits available. The Egress Credit Counter 1742 receives the FifoVal input and determines whether any read credits have been used, and if a read credit has been used, decrement a reader credits accumulator (not shown, e.g., within the egress credit counter 1742) and update a credit_avail signal. If there read credits available, the Egress Credit Counter 1742 sends to BGF Valid Logic 1748 an indication that read credits are available. The output of Egress Credit Counter 1742 is credit_avail.

Inputs to the Egress Credit Counter 1742 are:

Egress credits—indication of read credits that comes from the reader credits issuance logic 1738. When the read logic 1736 is ready to accept new packets, it sends credits from reader credits issuance logic 1738. Reader credits may serve to prevent overflow of packets received from the writer side 1710 that might otherwise 'bounce'.

FifoVal—when this signal is high (e.g., 'true', value of '1'), an entry is going to de-allocate from the Payload BGF 1722, because FifoVal causes a "read" from the Payload BGF 1722, e.g., by advancing the payload read pointer 1746. When FifoVal is high, a 'read' credit has been used, and the read credits accumulator (not shown) is decremented. FifoVal is output from BGF Valid logic 1748 to the Egress credit counter 1742.

BGFRun—Egress Credit Counter 1742 begins to operate when BGFRun is true.

Figure 18:
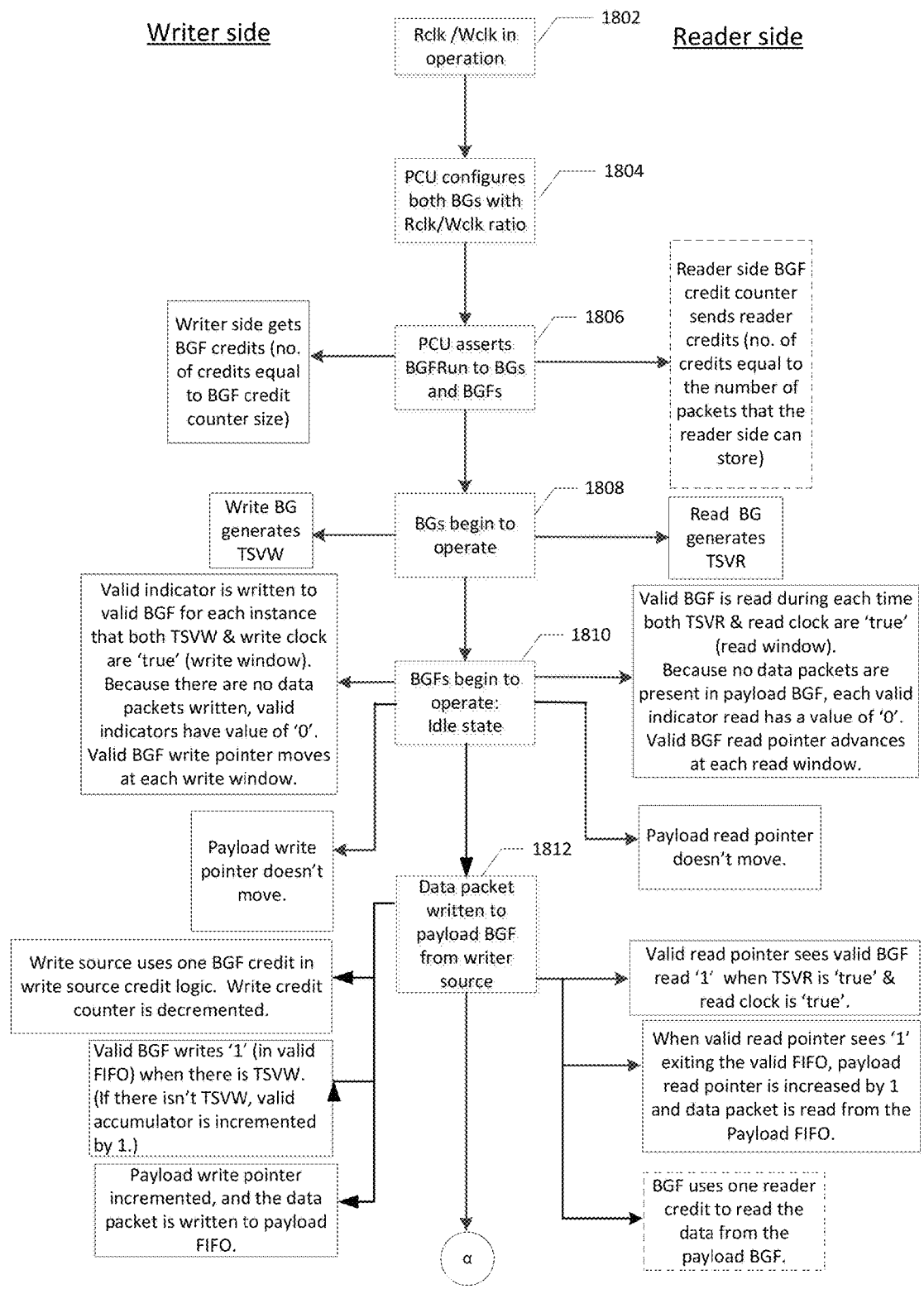
FIGS. 18-20 depict a flow diagram of a method according to embodiments of the present invention.
Figure 19:
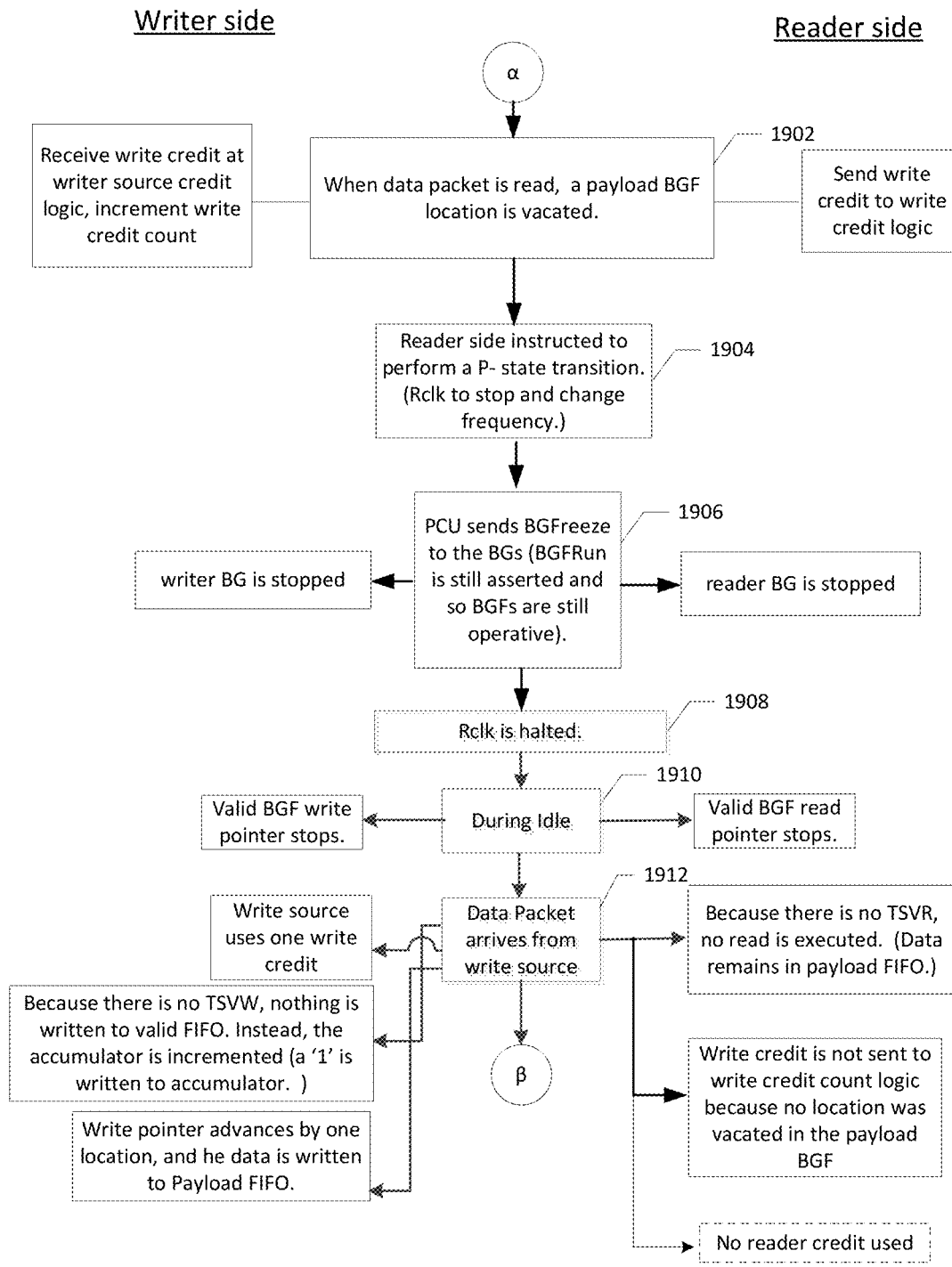
Figure 20:
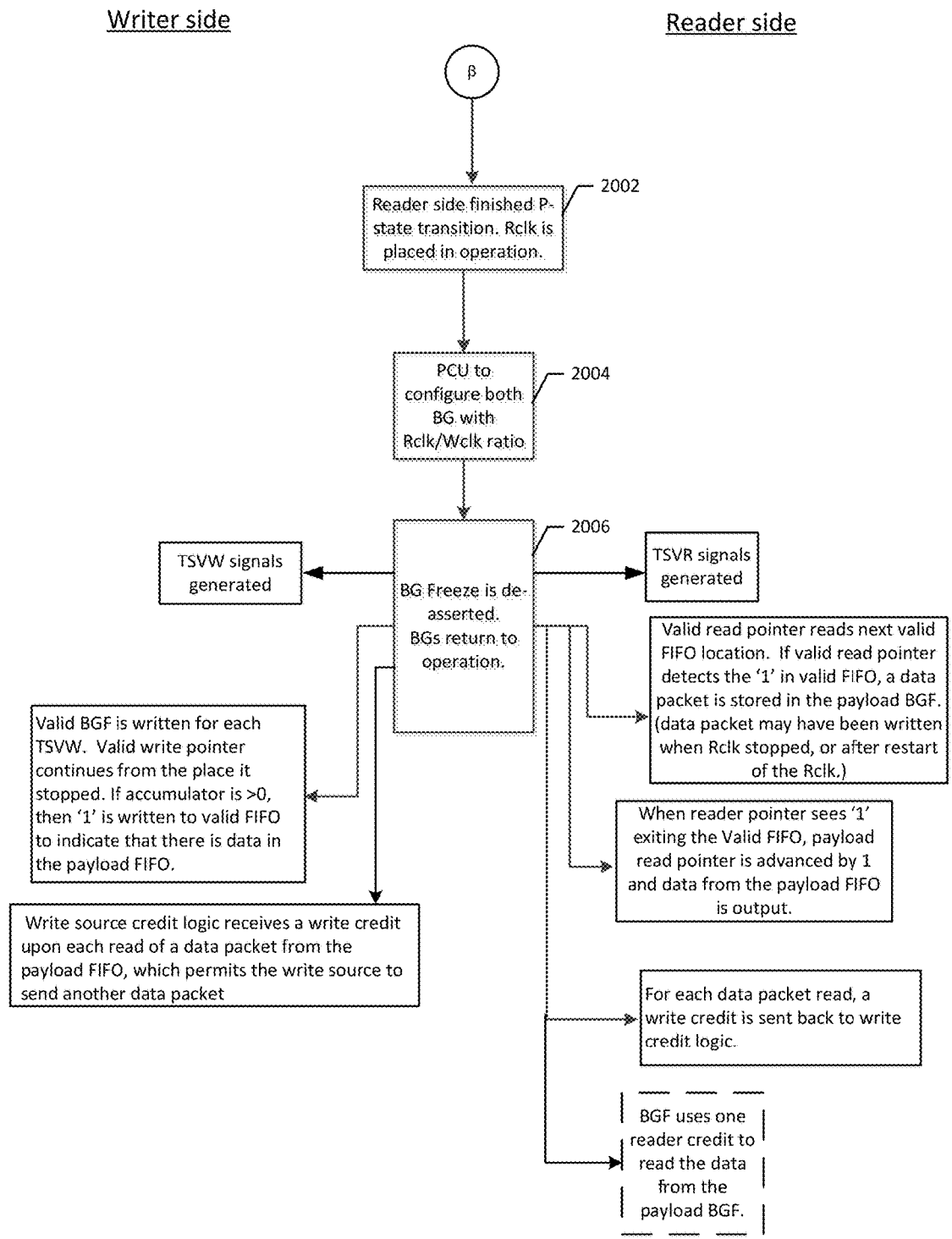

FIGS. 18-20 depict a flow diagram of a method according to embodiments of the present invention. At block 1802, both reader clock (Rclk) of a reader domain and writer clock (Wclk) of a writer domain of a processor are in operation. Continuing to block 1804, a power control unit (PCU) configures a read bubble generator ("read BG" or "RBG") and a write bubble generator ("write BG" or "WBG") with a ratio Rclk/Wclk of the bubble generators (BGs)—the "slower" BG is configured to be "true" for each clock cycle, while the "faster" BG is configured to operate according to the ratio of domain clock frequencies so that the domains will have an equal number of write windows and read windows per base clock cycle. Continuing to block 1806, the PCU asserts a BGFRun signal to the BGs and to the bubble generator FIFOs (payload BGF and valid BGF). The writer side receives initial write credits, the number of write credits equal to a BGF credit counter size, which may be equal to a size of a payload FIFO of the payload BGF, and of a valid FIFO of the valid BGF. Optionally, when reader credits are employed, reader credits issuance logic sends reader credits to an egress (reader) credit counter. (In an embodiment, the number of reader credits sent is equal to a total number of data packets that the reader side can store.)

Advancing to block 1808, the BGs begin to operate, e.g., the Write BG generates time slot valid write signals (TSVWs) and the read BG generates time slot valid read signals (TSVRs). Moving to block 1810, BG FIFOs (payload BGF and valid BGF) begin to operate. At startup of the BG FIFOs, on the writer side a valid indicator is written to the Valid BGF for each write window (e.g., TSVW and write clock are both 'true'). Because no data packets are written to the payload BGF during an idle state, each valid indicator will have a value of '0'. A write pointer of the valid BGF advances for each write of a valid indicator to the valid BGF, which occurs during each write window. On the reader side, a valid BGF read pointer advances for each read window (e.g., each instance of a 'true' value of both the read clock and the read BG). A payload BGF read pointer only advances when the valid BGF outputs a value of '1', which indicates that a data packet is written to a corresponding location in the payload BGF. Since there are no data packets written to the payload BGF, the payload BGF read pointer does not advance.

Proceeding to block 1812, a data packet is to be written to the payload BGF from a writer source in the writer side (write domain). On the writer side, due to the write of the data packet, the write source uses one write credit in write source credit logic, and a write credit counter in the write source credit logic decrements by one. A valid indicator having a value of '1' is written to the valid BGF. If the TSVW is high, the valid indication is written to a valid FIFO within the valid BGF. When the TSVW is low, the valid indication is written to a valid accumulator within the valid BGF. The payload write pointer incremented and the data packet is written to a payload FIFO of the payload BGF. On the reader side, when TSVR & read clock are both 'true' (e.g., read window) a valid BGF read pointer advances and reads the output of the valid BGF, e.g., valid indicator with a value of '1'. The payload read pointer is advanced by one location and the data packet is read from the payload BGF. Optionally, when reader credits are employed, one reader credit is used to read the data from the payload BGF.

Continuing to FIG. 19, at block 1902 the data packet is read and a storage location in the payload BGF is vacated. On the reader side a write credit is sent to the write source credit logic, as there is now a vacant location in the payload BGF. On the writer side, the writer source credit logic reads the write credit received from the reader side and increments the write credit count.

Advancing to block 1904, the reader side is instructed (e.g., by an operating system) to perform a P-state transition. Moving to block 1906, the Rclk (read clock) is active and the PCU sends a BGFreeze signal to the BGs, which stops each of the BGs. A BGFRun signal is still asserted and so the valid BGF and the payload BGF are operative.

Proceeding to block 1908, the Rclk is halted in order to execute the P-state transition. Continuing to block 1910, during idle (no data packets are being written), on the reader side the valid BGF read pointer stops, e.g. does not advance while both the Rclk and the read BG and are halted (e.g., no TSVRs are generated by the read BG). On the writer side, the valid BGF write pointer stops, e.g., does not advance, as no data packets are being written and the write BG is halted (e.g., no TSVWs are generated by the write BG).

Advancing to block 1912, a data packet arrives from the write source. On the writer side, the data packet is written to the payload BGF, one write credit is used from the write source credit logic, and the write credit counter is decremented. Because there is no TSVW, there is no write to the valid BGF. A '1' is written to an accumulator (e.g., accumulator is incremented by one). A payload BGF write pointer is advanced, and the data packet is written to the payload BGF. On the reader side, because there is no TSVR, no read of the payload BGF is executed. The data packet remains in the payload BGF. No write credit is sent from the reader side to the write source credit logic because no location was vacated in the payload BGF. If reader credits are employed, no reader credit is used because no read has occurred.

Continuing in FIG. 20, at block 2002 the reader side has finished its P-state transition and the reader side clock (Rclk) is placed in operation. Advancing to block 2004, the PCU configures the RBG and the WBG with an updated Rclk/Wclk ratio. Moving to block 2006, BG freeze is de-asserted, which results in a return to operation of RBG and WBG. On the writer side, TSVWs are again generated. For each write window, (e.g., instance of a TSVW (true' value) and write clock having a 'true' value) if an output of the write source to the valid BGF is '0' the accumulator is checked and if there are one or more indications of a previously written data packet to the payload BGF and if so, a '1' is written to the valid FIFO of the valid BGF and the accumulator is decremented, e.g., count of indications of previous writes to the payload BGF is reduced by one. A valid FIFO write pointer continues from the position where it stopped. On the reader side, TSVRs are again generated by the RBG. The valid read pointer location increments from a location where it stopped. If a '1' is detected in the valid FIFO, the payload read pointer location is incremented and a corresponding data packet is output from the payload BGF. A write credit is sent to the write source credit logic responsive to the read. If reader credits are employed, one reader credit is used to read the data packet from the payload BGF. On the writer side, the write credit counter logic receives the write credit from the reader side. The additional write credit permits the write source to write another data packet to the payload BGF. Note that the credit loops can be dynamically controlled as described herein to reduce credit communication latency by closing the loop within a single domain where possible.

Figure 21:
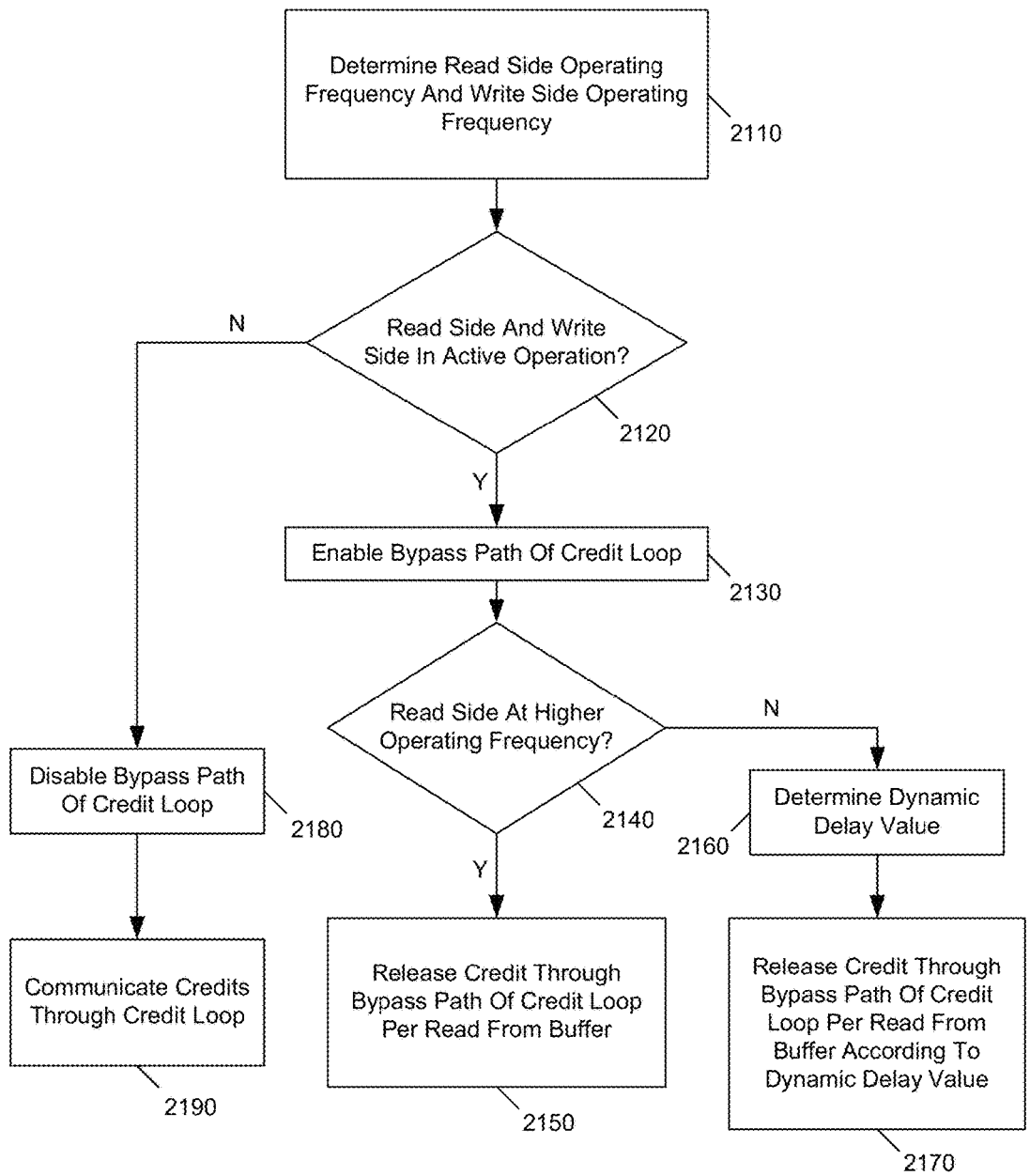
FIG. 21 is a flow diagram of a method in accordance with an embodiment of the present invention.

Referring now to FIG. 21, shown is a flow diagram of a method in accordance with an embodiment of the present invention. As shown in FIG. 21, method 2100 may be performed by hardware, software and/or firmware, such as control logic within a credit circuit to control operation of the credit circuit. As illustrated, method 2100 begins by determining a read side operating frequency and a write side operating frequency (block 2110). In other cases, this determination may be based on read side activity alone. In embodiments, this information may be received from a power controller, which sets operating frequency for these two domains. Next it is determined whether the read side and write side are both in active operation (diamond 2120). In an embodiment, this determination also may be based on information from the power controller, which can communicate power state information regarding various domains present in a processor.

Still referring to FIG. 21, if it is determined that both sides are in active operation, control passes to block 2130 where a bypass path of a credit loop of the credit circuit may be enabled. As an example, this bypass path, which may couple between a first path (from writer domain to reader domain) and a second path (from reader domain to writer domain), may be enabled by controlling one or more switches to bypass at least a portion of the credit loop. More specifically, this bypass path may operate to couple portions of the first and second paths present within the writer domain itself, such that a remainder of the credit loop that traverses additional portions of the writer domain and all of the reader domain can be bypassed from active operation.

Still with reference to FIG. 21, control next passes to diamond 2140 to determine whether the read side is operating at a higher operating frequency. Note that although shown as a separate decision diamond 2140, this determination may occur concurrently with the operation at block 2110. If it is determined that the read side is operating at a higher operating frequency, control passes to block 2150 where credits can be released through the bypass path of the credit loop directly or immediately. That is, a credit may be released through the bypass path immediately without any delay, for each read from the buffer (e.g., a BGF) by the reader domain.

As further shown in FIG. 21, instead if it is determined that the read side does not operate at a higher operating frequency, control passes to block 2160 where a dynamic delay value can be determined. In an embodiment, this dynamic delay value may be based on the operating frequency of the two domains, along with latency information. As an example, assume the reader side is 2× frequency of the write side, transfer latency is 1, and consumption latency is 1. In this instance, after a write to the BGF, the data is consumed after (transfer latency+consume latency) in the slower clock domain=2*reader clocks=2*2 writer clocks=4 writer clocks. If after the write, a credit propagation in the writer domain and reader domain is 2 writer clocks, then the credit return may be delayed by 4-2=2 clocks. Thereafter, control passes to block 2170 where credit information can be released through the bypass path according to this delay value.

Referring still to FIG. 21, instead if it is determined at diamond 2120 that both domains are not in active operation, control passes to block 2180 where the bypass path can be disabled. Note in other embodiments, this determination may be based on read side activity alone or other modes. As one example, the bypass path may be disabled for cases when the consume delay is unknown. For example, during a frequency change operation, a clock generator such as a phase lock loop (PLL) can stop its clock for some number of cycles without notifying the writer side. Data transfer happens correctly in this case because the BGF may be controlled to dynamically switch operation from a BGF mode to a Gray FIFO transfer mode. But in this instance, there is no writer side knowledge as to whether data were consumed. As a result, the full credit loop is activated. Similar operation may be applied in other cases, such as for providing BGF back pressure, to allow valid transfer to the reader side but preventing data read. In a flow to transfer control from a short credit loop to a long credit loop, such as when a BGF receives a request to move to an asynchronous mode, the bypass path is disabled, and the next credit traverses the long path.

In an embodiment, the bypass path may be disabled by control of one or more switches to thus remove presence of the bypass path between the two paths of the credit loop. Control thereafter passes to block 2190 where credit information may be communicated through the entire length of the credit loop. Understand while shown at this high level in the embodiment of FIG. 21, many variations and alternatives are possible. For example, in some cases a credit circuit may include multiple loops, namely a long loop that traverses through both reader and writer domains, and a second or bypass loop that traverses only within the writer domain. In such embodiments, control may occur such that only one of these loops is active at a given time, although understand that preparatory actions to perform transitions between the loops may occur.

Figure 22:
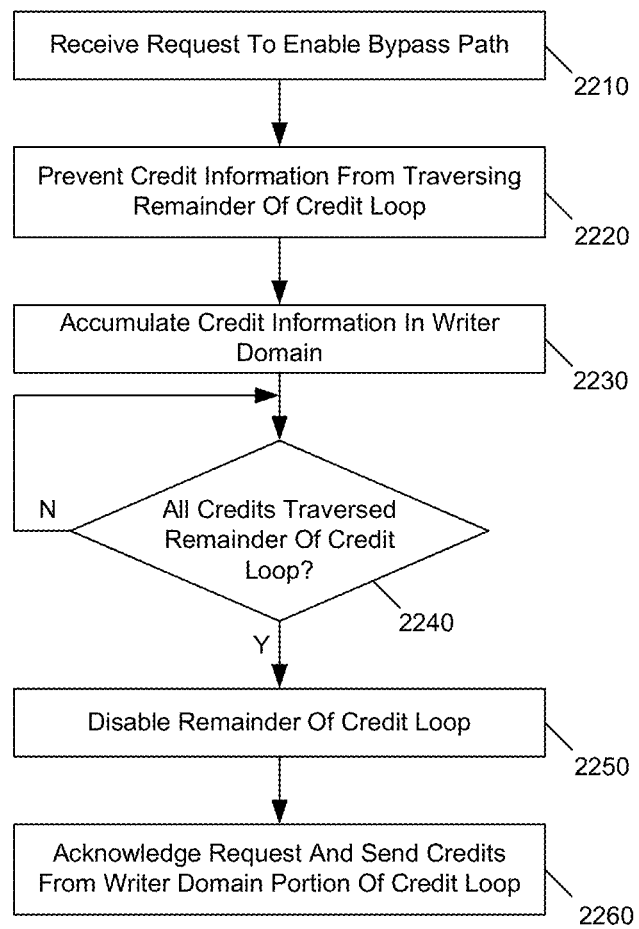
FIG. 22 is a flow diagram of a method in accordance with another embodiment of the present invention.

Referring now to FIG. 22, shown is a flow diagram of a method in accordance with another embodiment of the present invention. As shown in FIG. 22, method 2200, which may be performed at least in part by a credit control logic, shows a detailed method for enabling a bypass path in accordance with an embodiment. As illustrated, method 2200 begins by receiving a request to enable the bypass path (block 2210). Although in some cases this request may be received from an external logic, in other embodiments this request may be generated internally within the control logic of the credit circuit when it is determined that a power state transition has occurred, e.g., to a reader domain such that it is now in active operation.

At a high level, in a flow to move from the asynchronous mode to a synchronous mode, before the control logic acknowledges the request, it may: stop sending new credits to the full loop; accumulate new credits on the write side in an accumulator; wait until all credits that traverse through the full loop are returned; disable the full loop; and start returning credits from the short loop. Thus as illustrated, control next passes to block 2220 where credit information is prevented from traversing a remainder of a credit loop, namely the remainder that traverses some of the writer domain and all of the reader domain. At block 2230 credit information may be returned to the writer domain.

Still referring to FIG. 22, control next passes to diamond 2240 to determine whether all credits have traversed the remainder of the credit loop. When such determination is in the affirmative, control passes to block 2250 where the remainder of the credit loop can be disabled. For example, clocks signals and voltage signals may be switched off from being provided to this remainder portion of the credit loop, to reduce power consumption. Finally, at block 2260 the request for enabling the bypass path can be acknowledged. Still further, credits can be sent from the writer domain portion of the credit loop. Such credit information may include the accumulated credits, as well as further credits as may be generated as data is read from the BGF. Understand while shown at this high level in the embodiment of FIG. 22, many variations and alternatives are possible.

Figure 23:
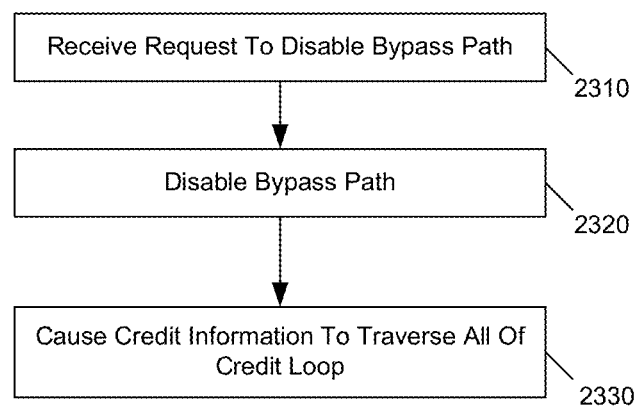
FIG. 23 is a flow diagram of a method for disabling a bypass path in accordance with an embodiment of the present invention.

With reference now to FIG. 23, shown is a flow diagram of a method for disabling a bypass path in accordance with an embodiment of the present invention. As illustrated, method 2300 begins by receiving a request to disable the bypass path (block 2310). As with a request for enabling the bypass path, understand that this request can be received from an external source or may be internally generated within the control logic of the credit circuit. Thereafter, control passes to block 2320 where the bypass path is disabled, e.g., by control of appropriate switches or so forth. Finally, control passes to block 2330, where credit information is caused to traverse all of the credit loop. Note that in an embodiment in which the remainder portion of the credit loop was previously powered down when the bypass path was enabled, understand that appropriate power and clock signals may be applied to such additional portions before the credit information begins traversing the full credit loop. Understand while shown at this high level in the embodiment of FIG. 23, many variations and alternatives are possible.

Embodiments thus enable dynamically different latencies for a credit loop based on mode of operation or other condition of one or more domains associated with the credit loop.

The following examples pertain to further embodiments.

In one example, a processor comprises: a credit circuit to communicate credit information between a first clock domain of the processor and a second clock domain of the processor. The credit circuit may have: a loopback path to communicate the credit information between the first clock domain and the second clock domain; and a bypass path to cause the credit information to traverse only a portion of the loop, based at least in part on a state of the second clock domain.

In an example, the processor further comprises a control logic to enable the bypass path when the first clock domain and the second clock domain are in an active state.

In an example, the control logic is to disable a remainder portion of the loopback path after the bypass path is enabled.

In an example, the control logic is to disable the bypass path when at least the second clock domain is to enter into a low power state.

In an example, the control logic is to cause the credit information to traverse the portion of the loopback path and the remainder portion of the loopback path when the bypass path is disabled.

In an example, the credit circuit further comprises a selection logic, and the control logic is to enable the bypass path and cause the selection logic to provide the credit information from the bypass path to the first clock domain after a delay period, when a frequency of the second clock domain is less than a frequency of the first domain.

In an example, the control logic is to enable the bypass path and cause the selection logic to provide the credit information from the bypass path to the first clock domain without the delay period, when the frequency of the second clock domain is greater than the frequency of the first domain.

In an example, the control logic is to calculate the delay period based at least in part on the frequency of the first clock domain, the frequency of the second clock domain and latency information.

In an example, the loopback path is formed of: a first path having a first plurality of delay elements; and a second path having a second plurality of delay elements.

In an example, the bypass path is to couple between a first one of the first plurality of delay elements and a selection logic coupled between a first delay element of the second plurality of delay elements and a second delay element of the second plurality of delay elements.

In an example, the credit information comprises a clock signal to clock the first plurality of delay elements and the second plurality of delay elements.

In an example, when the bypass path is enabled, the credit information is to traverse the credit circuit within the first clock domain only.

In another example, a method comprises: enabling a bypass path of a credit circuit coupled between a writer circuit and a reader circuit of a processor based at least in part on a state of the reader circuit; providing credit information from a first portion of the writer circuit to a second portion of the writer circuit via the bypass path, to bypass providing the credit information to the reader circuit; and providing the credit information from the second portion of the writer circuit to a write logic of the writer circuit, to enable the write logic to store data into a buffer of the writer circuit, the reader circuit to read the data from the buffer.

In an example, the method further comprises disabling a remainder portion of the credit circuit after the bypass path is enabled.

In an example, the method further comprises disabling the bypass path when at least the reader circuit is to enter into a low power state.

In an example, the method further comprises: providing the credit information to the second portion of the writer circuit via the bypass path after a delay period when a frequency of the reader circuit is less than a frequency of the writer circuit; and providing the credit information to the second portion of the writer circuit via the bypass path without the delay period when the frequency of the reader circuit is greater than the frequency of the writer circuit.

In an example, the method further comprises calculating the delay period based at least in part on the frequency of the writer circuit, the frequency of the reader circuit and latency information.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises: a processor including one or more cores, where at least one of the one or more cores comprises: a writer circuit to operate according to a first clock, the writer circuit including a write source and a first buffer to store data packets written by the write source; a reader circuit to operate according to a second clock and to read data packets from the first buffer; and a credit circuit to communicate credit information between the writer circuit and the reader circuit. As an example, the credit circuit may have: a loop to communicate the credit information between the writer circuit and the reader circuit; a bypass path controllable to couple between a first element of the loop and a selection logic of the loop; and a control logic to enable the bypass path to couple between the first element of the loop and the selection logic of the loop to enable the credit information to be communicated from the first element of the loop to the selection logic of the loop via the bypass path when the reader circuit is in an active state, where the control logic is to control the selection logic to provide the credit information communicated from the first element of the loop to a second element of the loop coupled to an output of the selection logic when the bypass path is enabled. The system may further include a dynamic random access memory coupled to the processor.

In an example, the control logic is to cause the bypass path to be decoupled when a read time of the first buffer by the reader circuit is unknown.

In an example, the writer circuit comprises the first element of the loop, the second element of the loop, and the selection logic.

In another example, an apparatus comprises: at least one core means for executing instructions; and means for communicating credit information between a first domain and a second domain. As an example, the means for communicating may have: loop means for communicating the credit information between the first domain and the second domain; and bypass means for causing the credit information to traverse only a portion of the loop means, based at least in part on a state of the second domain.

In an example, the apparatus further comprises control means for enabling the bypass means when the first domain and the second domain are in an active state.

In an example, the control means is to disable a remainder portion of the loop means after the bypass means is enabled.

In an example, the control means is to disable the bypass means when at least the second domain is to enter into a low power state.

In an example, the loop means is formed of: a first path means having a first plurality of delay means; and a second path means having a second plurality of delay means.

In an example, the bypass means is to couple between a first one of the first plurality of delay means and a selection means coupled between a first delay means of the second plurality of delay means and a second delay means of the second plurality of delay means.

In other examples, buffer interface circuitry is provided to interface a buffer that couples to multiple clock domains to control clock crossing activities. In various examples, this circuitry may be provided in an apparatus having one or more processing elements, a fabric, a buffer and buffer control logic to control read and write activities with regard to the buffer. In addition, this buffer control logic may include credit circuitry including a bypass path as described herein. The buffer control logic may dynamically control the bypass path to regulate write access to the buffer based on a power state of one or more processing elements, an expected data consumption rate of the processing element(s), a frequency of the second clock domain, or a combination thereof, among other possible operating parameters.

In examples, different types of buffer arrangements are possible including, for example, first-in first-out (FIFO) buffers and bubble generator FIFOs (BGFs), among others. Still further, understand that processing elements that may leverage a buffer interface as described herein may include a variety of different processing elements including cores, GPUs, FPGAs and so forth. Also in embodiments, different fabric arrangements are possible including ring topologies, mesh topologies, torus topologies or so forth.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
    a credit circuit to communicate credit information between a first clock domain of the processor and a second clock domain of the processor, the credit circuit having:
        a loopback path to communicate the credit information between the first clock domain and the second clock domain; and
        a bypass path to cause the credit information to traverse only a portion of the loopback path, based at least in part on a state of the second clock domain.

2. The processor of claim 1, further comprising a control logic to enable the bypass path when the first clock domain and the second clock domain are in an active state.

3. The processor of claim 2, wherein the control logic is to disable a remainder portion of the loopback path after the bypass path is enabled.

4. The processor of claim 3, wherein the control logic is to disable the bypass path when at least the second clock domain is to enter into a low power state.

5. The processor of claim 4, wherein the control logic is to cause the credit information to traverse the portion of the loopback path and the remainder portion of the loopback path when the bypass path is disabled.

6. The processor of claim 2, wherein the credit circuit further comprises a selection logic, and the control logic is to enable the bypass path and cause the selection logic to provide the credit information from the bypass path to the first clock domain after a delay period, when a frequency of the second clock domain is less than a frequency of the first clock domain.

7. The processor of claim 6, wherein the control logic is to enable the bypass path and cause the selection logic to provide the credit information from the bypass path to the first clock domain without the delay period, when the frequency of the second clock domain is greater than the frequency of the first clock domain.

8. The processor of claim 6, wherein the control logic is to calculate the delay period based at least in part on the frequency of the first clock domain, the frequency of the second clock domain and latency information.

9. The processor of claim 1, wherein the loopback path is formed of:
    a first path having a first plurality of delay elements;
    a second path having a second plurality of delay elements.

10. The processor of claim 9, wherein the bypass path is to couple between a first one of the first plurality of delay elements and a selection logic coupled between a first delay element of the second plurality of delay elements and a second delay element of the second plurality of delay elements.

11. The processor of claim 9, wherein the credit information comprises a clock signal to clock the first plurality of delay elements and the second plurality of delay elements.

12. The processor of claim 1, wherein when the bypass path is enabled, the credit information is to traverse the credit circuit within the first clock domain only.

13. A non-transitory machine-readable medium having stored thereon instructions, which if performed by a machine cause the machine to perform a method comprising:
    enabling a bypass path of a credit circuit coupled between a writer circuit and a reader circuit of a processor based at least in part on a state of the reader circuit;
    providing credit information from a first portion of the writer circuit to a second portion of the writer circuit via the bypass path, to bypass providing the credit information to the reader circuit; and
    providing the credit information from the second portion of the writer circuit to a write logic of the writer circuit, to enable the write logic to store data into a buffer of the writer circuit, the reader circuit to read the data from the buffer.

14. The non-transitory machine-readable medium of claim 13, wherein the method further comprises disabling a remainder portion of the credit circuit after the bypass path is enabled.

15. The non-transitory machine-readable medium of claim 13, wherein the method further comprises disabling the bypass path when at least the reader circuit is to enter into a low power state.

16. The non-transitory machine-readable medium of claim 13, wherein the method further comprises:
    providing the credit information to the second portion of the writer circuit via the bypass path after a delay period when a frequency of the reader circuit is less than a frequency of the writer circuit; and
    providing the credit information to the second portion of the writer circuit via the bypass path without the delay period when the frequency of the reader circuit is greater than the frequency of the writer circuit.

17. The non-transitory machine-readable medium of claim 16, wherein the method further comprises calculating the delay period based at least in part on the frequency of the writer circuit, the frequency of the reader circuit and latency information.

18. A system comprising:
    a processor including one or more cores, wherein at least one of the one or more cores comprises:
        a writer circuit to operate according to a first clock, the writer circuit including a write source and a first buffer to store data packets written by the write source;
        a reader circuit to operate according to a second clock and to read data packets from the first buffer; and
        a credit circuit to communicate credit information between the writer circuit and the reader circuit, the credit circuit having:
            a loop to communicate the credit information between the writer circuit and the reader circuit;
            a bypass path controllable to couple between a first element of the loop and a selection logic of the loop; and
            a control logic to enable the bypass path to couple between the first element of the loop and the selection logic of the loop to enable the credit information to be communicated from the first element of the loop to the selection logic of the loop via the bypass path when the reader circuit is in an active state, wherein the control logic is to control the selection logic to provide the credit information communicated from the first element of the loop to a second element of the loop coupled to an output of the selection logic when the bypass path is enabled; and a dynamic random access memory coupled to the processor.

19. The system of claim 18, wherein the control logic is to cause the bypass path to be decoupled when a read time of the first buffer by the reader circuit is unknown.

20. The system of claim 19, wherein the writer circuit comprises the first element of the loop, the second element of the loop, and the selection logic.

* * * * *